United States Patent
Saulys et al.

(10) Patent No.: US 7,783,546 B2
(45) Date of Patent: Aug. 24, 2010

(54) AUTOMATED FINANCIAL INSTRUMENT EXCHANGE APPARATUS AND SYSTEMS

(75) Inventors: Vincent V. Saulys, Metuchen, NJ (US); David M. Cohen, New York, NY (US); Richard P. McNeil, Brooklyn, NY (US)

(73) Assignee: Goldman Sachs & Co., New York, NY (US)

( * ) Notice: Subject to any disclaimer, the term of this patent is extended or adjusted under 35 U.S.C. 154(b) by 1943 days.

(21) Appl. No.: 10/354,522

(22) Filed: Jan. 30, 2003

(65) Prior Publication Data
US 2004/0153390 A1    Aug. 5, 2004

(51) Int. Cl.
G06Q 40/00    (2006.01)
(52) U.S. Cl. .......................... 705/36 R; 705/37; 705/35
(58) Field of Classification Search ................ 705/37, 705/36 R, 35, 1, 38
See application file for complete search history.

(56) References Cited

U.S. PATENT DOCUMENTS

| | | | |
|---|---|---|---|
| 5,671,363 A * | 9/1997 | Cristofich et al. | 705/37 |
| 5,915,209 A * | 6/1999 | Lawrence | 340/3.7 |
| 6,161,099 A * | 12/2000 | Harrington et al. | 705/36 R |
| 7,330,831 B2 * | 2/2008 | Biondi et al. | 705/36 T |
| 7,472,098 B2 * | 12/2008 | Shields et al. | 706/36 |
| 7,529,701 B2 * | 5/2009 | Shields et al. | 705/35 |
| 7,567,935 B2 * | 7/2009 | Tell et al. | 705/37 |
| 7,689,489 B2 * | 3/2010 | Fergusson | 705/35 |
| 2002/0046154 A1 * | 4/2002 | Pritchard | 705/37 |
| 2004/0143536 A1 * | 7/2004 | Haberle | 705/37 |

OTHER PUBLICATIONS

Downes et al. "Dictionary of Finance and Investment Terms" 1998, Barron's Financial Guides, Fifth Edition, pp. 59-60.*
Dhillon et al. "The effect of dividend changes on stock and bond prices." Mar. 1994 Journal of Finance, v49, n1, p. 281(9).*
Nalbantian, Edward "Public-private partnerships" Dec. 1998, Balance Sheet v7n1 pp. 21-23.*
Sales, Robert "B2B Exchanges Come to Life.(business-to-business exchanges)" Oct. 2000 Wall Street & Technology, 18, 10, 32.*
Anonymous "High Anxiety in E-business.(Company Business and Marketing)" Jun. 2001 Wall Street & Technology, 19, 6, 4.*
Thompson, Kathleen "New field-of-membership possibilities" Jun. 2003 Credit Union Magazine v69n6 pp. 63.*
"Federative Republic of Brazil," The Goldman Sachs Group, Inc., Innovate Case (2000 Annual Report).

* cited by examiner

*Primary Examiner*—Kelly Campen
(74) *Attorney, Agent, or Firm*—Walter G. Hanchuk; Chadbourne & Parke LLP

(57) ABSTRACT

Deal information associated with a bond exchange is determined, the deal information including information associated with a plurality of eligible financial instruments and at least one new financial instrument. In addition, offer information is received from a plurality of remote client devices via a communication network. An exchange allocation is then automatically calculated based on the deal information and the offer information. Moreover, target information associated with at least one financial instrument may be determined and used to calculate the exchange allocation.

30 Claims, 25 Drawing Sheets

| ISSUER IDENTIFIER 1702 | ISSUER NAME 1704 | BOND EXCHANGES 1706 | CONTACT NAME 1708 | CONTACT INFORMATION 1710 |
|---|---|---|---|---|
| ISS-101 | ABC CORPORATION | E-101, E-102 | MS. WEST | WEST@ABC.COM |
| ISS-102 | GOVERNMENT OF GERMANY | E-103 | MR. SMITH | (212) 555-1212 |

FIG. 17

| EXCHANGE IDENTIFIER 1802 | NEW ISSUE IDENTIFIER(S) 1804 | ELIGIBLE ISSUE IDENTIFIER(S) 1806 | OPEN DATE AND TIME 1808 | CLOSE DATE AND TIME 1810 |
|---|---|---|---|---|
| E-101 | B101 | B402, B403, B404 | 1/1/03, NOON | 1/15/03, NOON |
| E-102 | B102 | B401, B402 | 1/1/03, NOON | 1/15/03, NOON |
| E-103 | B200 | B650, B555, B123A | 6/1/03, 11:30 AM | 6/1/04, 3:30 PM |

| CLIENT IDENTIFIER 1902 | CLIENT NAME 1904 | CONTACT NAME 1906 | CONTACT INFORMATION 1908 |
|---|---|---|---|
| CL-101 | XYZ CORPORATION | MS. JOHNSON | (212) 123-1234 |
| CL-102 | BANK OF ENGLAND | MR. JONES | MR_J@BONY.COM |

FIG. 19

| OFFER IDENTIFIER 2002 | SUBMISSION DATE AND TIME 2004 | EXCHANGE IDENTIFIER 2006 | ELIGIBLE ISSUE IDENTIFIER 2008 | AMOUNT 2010 | PRICE 2012 | STATUS 2014 |
|---|---|---|---|---|---|---|
| LOT-101 (CL-101) | 1/7/03, 2:30 PM | E-101 | B402 | 1,000,000 | $998.05 | SAVED |
| LOT-102 (CL-101) | 1/7/03 2:31 PM | E-101 | B403 | 2,000,000 | $875.00 | SUBMITTED |
| LOT-103 (CL-102) | 8/12/03, 4:14 PM | E-103 | B555 | 10,000,000 | $1,001.15 | ACCEPTED |
| LOT-104 (CL-103) | 8/15/03, 10:00 AM | E-107 | B833A | 500,000 | $1,020.64 | SUBMITTED |

AUTOMATED FINANCIAL INSTRUMENT EXCHANGE APPARATUS AND SYSTEMS

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to financial instrument exchanges. In particular, the present invention relates to automated financial instrument exchange apparatus and systems.

BACKGROUND

An issuer might have a number of different financial instruments outstanding at the same time. For example, an issuer could have five different bonds outstanding, each bond being due on a different date. The complex and unusual structure of such debt can sometimes lower the perceived worth of any future bonds that might be issued.

To address this problem, it is known that a bond exchange can be held to swap the old bonds with a newly issued bond. FIG. 1 illustrates a known bond exchange 100 in which a client 120 provides "eligible issues" (i.e., the old bonds) to an issuer 110 in return for a "new issue" (i.e., the new bond). In this way, the issuer 110 can consolidate debt (e.g., by replacing ten outstanding bonds with a single new bond). The issuer 110 may also use the bond exchange as a way of extending debt.

Note that different clients 120 might have different opinions as to the worth of the new bonds as compared to the old bonds. As a result, clients 120 can submit offers, referred to as letters of transmittal, to the issuer 110. For example, the bond exchange 100 might be structured as a "forward" exchange (in which clients 120 submit bids on the value of old bonds to be exchanged for a fixed amount of new bonds) or a "reverse" exchange (in which clients 120 submit bids on the value of new bonds to be exchanged for a fixed amount of old bonds). In either case, the client 120 might submit an offer that indicates, for example, a bid price (or a spread to a reference instrument) along with a number of bonds he or she is interested in exchanging. The issuer 110 then executes the exchange with the clients 120 who submitted the most appropriate bids.

The bond exchange process, however, can be difficult to perform. Consider two clients who both submit identical letters of transmittal to an issuer that wants to issue fifteen thousand new bonds. In this case, the issuer might allocate new bonds on a first-submitted, first-allocated basis. For example, if a first client submits an offer to exchange ten thousand bonds while a second client later submits an offer to exchange twenty thousand bonds (at the same price), the issuer would allocate ten thousand new bonds to the first client and five thousand new bonds to the second client.

As another approach, the issuer might allocate new bonds on a pro-rated basis in accordance with on the number of bonds associated with each offer. For example, if a first client submits an offer to exchange ten thousand bonds while a second client later submits an offer to exchange twenty thousand bonds (at the same price), the issuer would allocate five thousand bonds to the first client and ten thousand bonds to the second client (i.e., the second client would receive twice as many new bonds). The complexity of such allocations will grow as the number of eligible issues, new issues, and/or clients increases.

Moreover, even a small error in a letter of transmittal and/or the allocation process can have serious consequences, especially when a significant amount of value is associated with the bond exchange.

SUMMARY

To alleviate problems inherent in the prior art, the present invention introduces automated financial instrument exchange apparatus and systems.

According to one embodiment, deal information associated with a financial instrument exchange is determined, the deal information including information associated with a plurality of eligible financial instruments and at least one new financial instrument. In addition, offer information is received from a plurality of remote client devices via a communication network. An exchange allocation is then automatically calculated based on the deal information and the offer information. According to some embodiments, target information associated with at least one of the financial instruments (i.e., an eligible and/or a new financial instrument) is also determined and used to calculate the exchange allocation.

One embodiment comprises: means for determining deal information associated with a financial instrument exchange, the deal information including information associated with a plurality of eligible financial instruments and at least one new financial instrument; means for receiving offer information from a plurality of remote client devices via a communication network; and means for automatically calculating an exchange allocation based on the deal information and the offer information. Some embodiments also include means for determining target information associated with at least one of the financial instruments.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIGS. 17 through 21 are tabular representations of portions of bond exchange databases according to one embodiment of the present invention.

DETAILED DESCRIPTION

Some embodiments described herein are associated with a "financial instrument" exchange. As used herein, the phrase "financial instrument" may refer to, for example, any type of security. One example of a financial instrument is a bond, or any other debt instrument, in which an issuer promises to pay to bondholders principal and interest according to the terms and conditions of the bond. The bonds may be, for example, floating or fixed coupon instruments. The issuer may be, for example, a corporation. The issuer could instead be a government entity, such as a foreign government, a local government, the United States (US) Federal Home Loan Mortgage Corporation (FHLMC or "Freddie Mac") or the US Federal National Mortgage Association (FNMA or "Fannie Mae").

Automated Bond Exchange System

Figure 2:
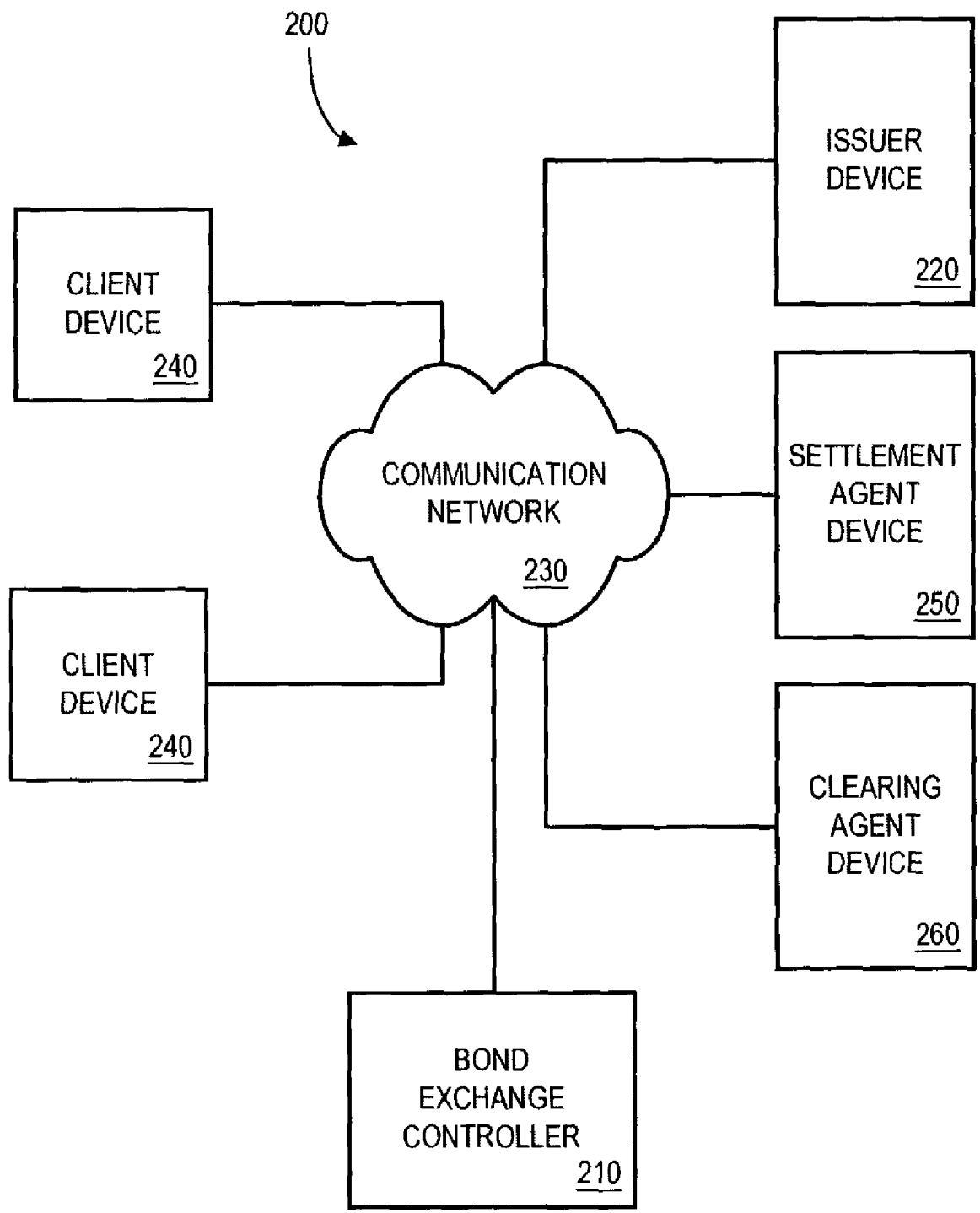
FIG. 2 is a block diagram overview of an automated bond exchange system according to some embodiments of the present invention.

FIG. 2 is a block diagram overview of an automated bond exchange system 200 including a bond exchange controller 210 according to some embodiments of the present invention. The bond exchange controller 210 may, for example, communicate with an issuer device 220 via a communication network 230. Similarly, the bond exchange controller 210 may exchange information with client devices 240, a settlement agent device 250, and/or a clearing agent device 260 via the communication network 230.

The bond exchange controller 210, issuer device 220, client devices 240, settlement agent device 250, and/or clearing agent device 260 may be any devices capable of performing the various functions described herein. For example, a client device 240 might be a Personal Computer (PC) associated with a "client." As used herein, the term "client" may refer to, for example, an individual or entity that owns, buys, and/or sells bonds.

The bond exchange controller 210 may be, for example, a Web server adapted to exchange information via an Internet Protocol (IP) network (e.g., the Internet). Note that the communication network 230 might comprise one or more other networks, including an intranet, a Local Area Network (LAN), a Metropolitan Area Network (MAN), a Wide Area Network (WAN), a proprietary network, a Public Switched Telephone Network (PSTN), and/or a wireless network.

According to some embodiments, the bond exchange controller 210 communicates with other devices via a temporary computer communication channel (e.g., a path through which information can be exchanged). In other words, the communication channel between the bond exchange controller 210 and another device may be established and discontinued as appropriate. Note that an established communication channel does not need to be associated with a particular physical path. For example, the bond exchange controller 210 may exchange information with a remote issuer device 220 via a Web site, in which case packets of information may be transmitted via various physical paths.

According to other embodiments, the bond exchange controller 210 communicates with other devices via a public computer communication network. That is, at least a portion of the communication network 230 may be accessed by devices other than the devices described herein. Note, however, that the information exchanged by the bond exchange controller 210 could be encrypted or otherwise protected to prevent a third party from accessing (i.e., understanding) the information.

According to still other embodiments, the bond exchange controller 210 communicates with devices via a computer communication channel that is potentially accessible by a plurality of unrelated devices. For example, a single port or line associated with the bond exchange controller 210 might communicate with a first client device 240 for a period of time and then with a second, unrelated client device 240 (i.e., the first and second client devices 240 may be associated with different traders or clients).

Although a single bond exchange controller 210 is shown in FIG. 2, any number of these devices may be included in the automated bond exchange system 200. Similarly, any number of other device described herein may be included according to embodiments of the present invention. Note that some of devices illustrated in FIG. 2 may actually be incorporated in a single device. For example, the bond exchange controller 210 might also act as a settlement agent device 250.

Figure 3:
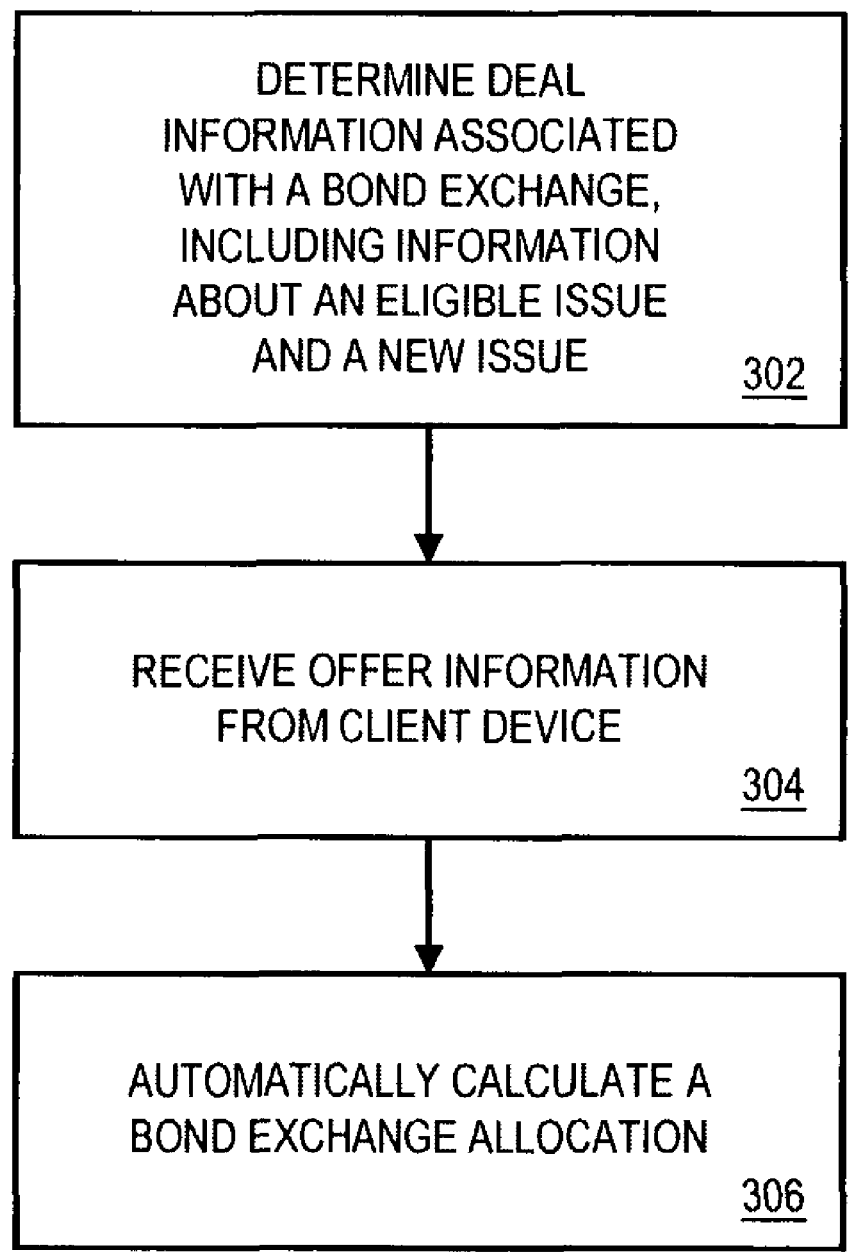
FIG. 3 is a flow chart of a method according to some embodiments of the present invention.

FIG. 3 is a flow chart of a method that might be performed, for example, by the bond exchange controller 210 according to some embodiments of the present invention. The flow charts described herein do not imply a fixed order to the steps, and embodiments of the present invention may be practiced in any order that is practicable.

At 302, deal information associated with a bond exchange is determined, the deal information including information associated with at least one "eligible issue" (e.g., an old bond that the issuer wants to remove from circulation) and at least one "new issue" (e.g., a new bond that the issuer wants to introduce). Note that the deal information might include information about a number of different eligible issues and/or new issues.

The deal information might be determined by receiving the information from an issuer device 220 (e.g., via a Web page). The deal information might also be determined by retrieving the information from a database (e.g., after an operator enters the information into the database).

The deal information may include information about the issuer, such as an issuer identifier, name, address, and/or contact information (e.g., a phone number or email address). The deal information might also include information about the bonds associated with the exchange, such as a bond identifier and name, reference bond information, a minimum price (e.g., as a percentage of face value), a maximum price, a price increment (e.g., a minimum increment by which a client can adjust a price), yield information (e.g., the rate of return associated with the bond), target information, and coupon information (e.g., the stated interest rate for the bond).

Other deal information might include an "open" date and time (e.g., indicating when offers will first be accepted from clients), a "close" date and time (e.g., indicating when offers will no longer be accepted), a settlement date, and a deal status (e.g., indicating whether the deal is pending, in process, or complete). Supplemental deal information might also be determined by the bond exchange controller 210, such as the text of an invitation announcement and/or a press release associated with the exchange.

At 304, offer information is received from a plurality of remote client devices 240. For example, a remote client device 240 might transmit offer information to the bond exchange controller 210 via a Web page. The offer information might include information about the client who is submitting the offer, such as a client identifier, name, address, and/or contact information. The offer information might further identify the particular bond exchange associated with the offer.

The offer information may also identify a particular bond (e.g., an eligible issue), along with a bond amount, a bid type (e.g., indicating whether or not the bid is non-competitive), clearing agent information, a bond price, and/or a bond spread. According to some embodiments, the received offer information comprises an electronic letter of transmittal.

At 306, a bond exchange allocation is automatically calculated based on the deal information and the offer information. For example, the bond exchange controller 210 might calculate which clients will receive a new bond and/or how many bonds each client will receive (e.g., based on offer dates, offer times, and an optimization of issuer benefit). Note that deal information is "automatically" calculated in that at least some of the calculations are performed by an automated process (although some operator action might be involved, such as initiating the process).

According to some embodiments, the bond exchange controller 210 also determines "target information" associated with at least one of the issues (i.e., an eligible and/or a new issue). For example, the issuer device 220 might transmit the target information to the bond exchange controller 210 via a Web site. The bond exchange controller 210 can then optimize exchange allocation results based on the target information. In this way, the exchange can be priced based on an issuer's specific goals. The target information might include, for example, a bond price, a bond quantity, and/or present value savings information.

Issuer Information

Figure 4:
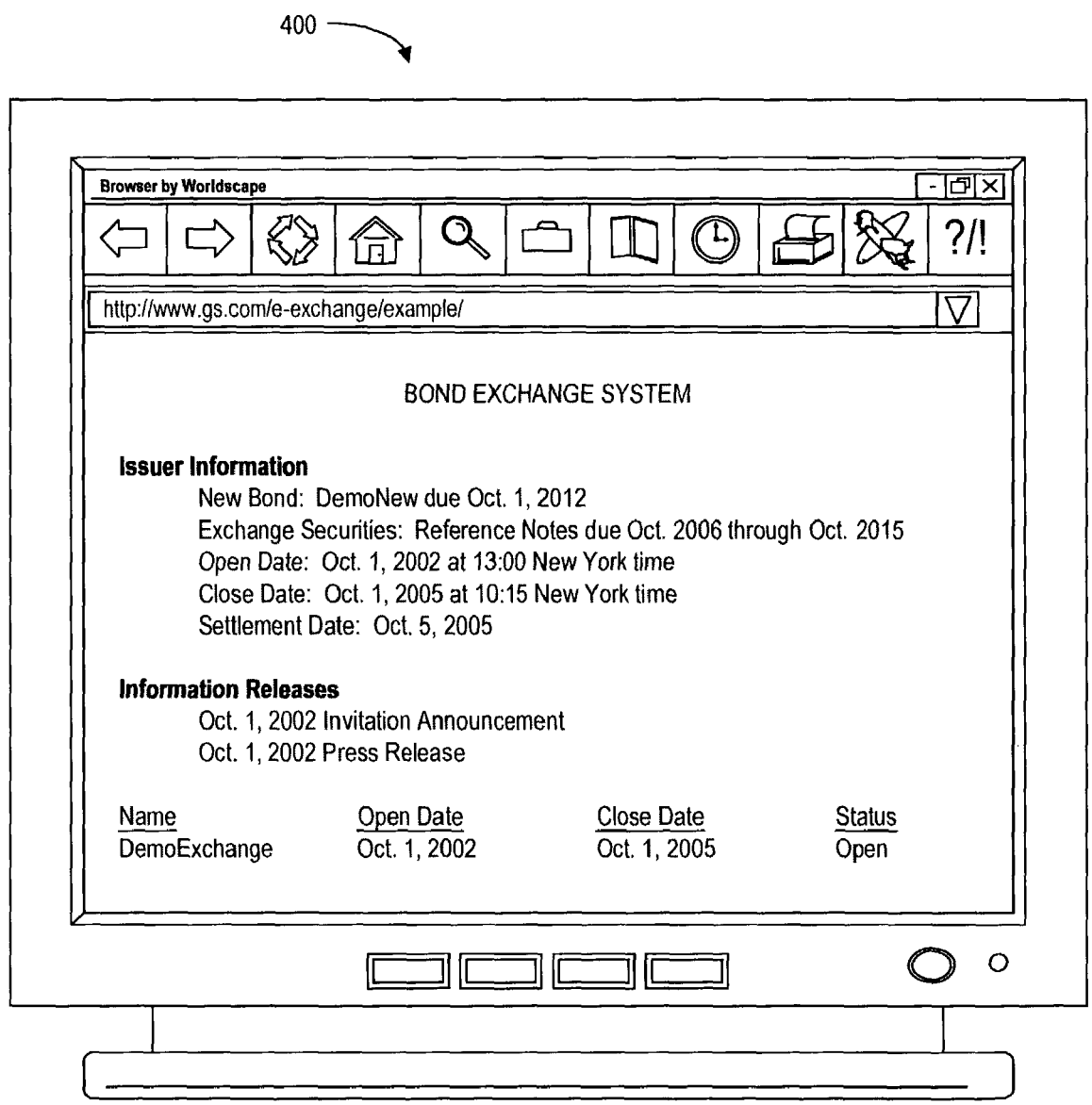
FIGS. 4 and 5 illustrate issuer displays according to some embodiments of the present invention.

FIG. 4 illustrates a display 400 that provides information about an issuer and/or a bond exchange according to some embodiments of the present invention. In particular, the display 400 comprises a Graphical User Interface (GUI) that can be used by an issuer or client to exchange information with the bond exchange controller 210 (e.g., by accessing a Web site via a remote issuer device 220 or client device 240).

As can be seen in FIG. 4, the display 400 provides information about the bond exchange, including the name of the new issue (i.e., "DemoNew due Oct. 1, 2012"), eligible issues (i.e., "reference notes due October 2005 through October 2015"), the open date and time, the close date and time, and the settlement date. According to some embodiments, an issuer can use this display 400 to provide such information to the bond exchange controller 210.

Figure 5:
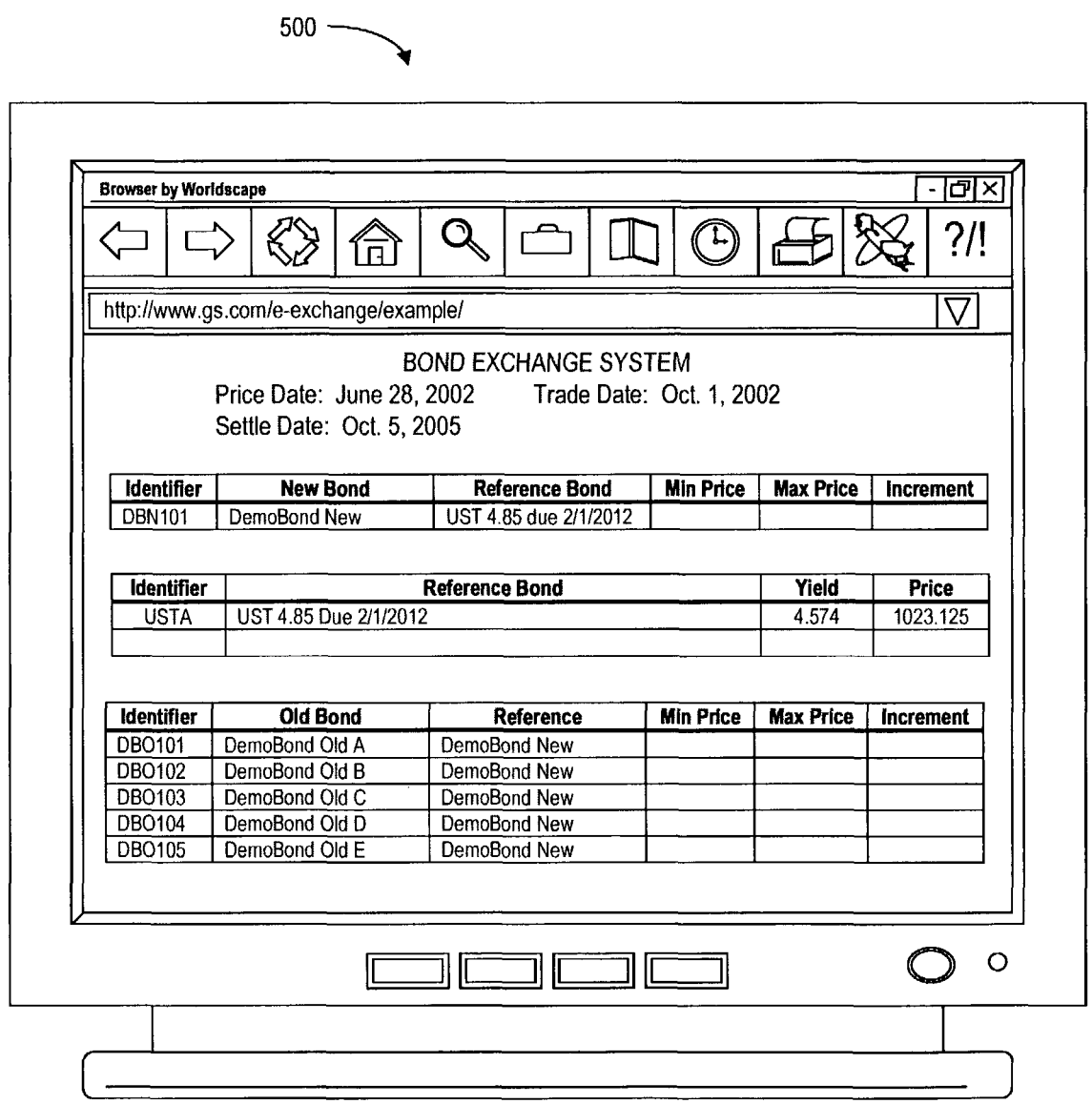

FIG. 5 illustrates another display 500 that provides information about an issuer and/or a bond exchange. In particular, the display 500 identifies a reference bond (e.g., a US Treasury bond) and provides detailed information about the eligible issues (i.e., DemoBond Old A though E), including a minimum price, a maximum price, and a price increment. Note that the issuer can also use this display 500 to provide such information to the bond exchange controller 210.

Client Information

Figure 6:
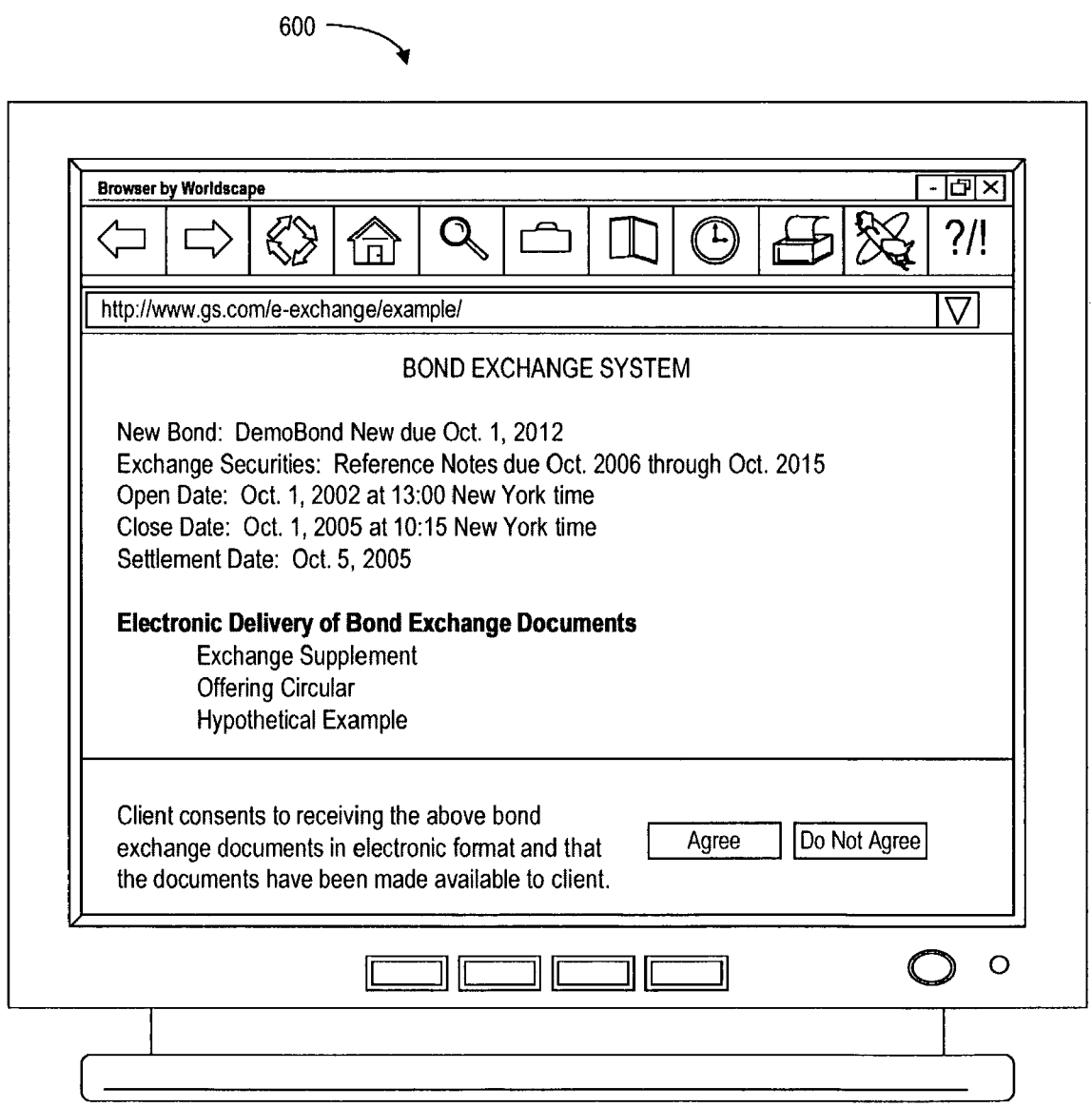
FIGS. 6 and 7 illustrate client displays according to some embodiments of the present invention.

FIG. 6 illustrates a client display 600 according to some embodiments of the present invention. In particular, the client can use the display 600 to access information about a bond exchange (e.g., an exchange supplement, an offering circular, and/or a hypothetical example associated with the exchange). The client might also provide an indication that he or she agrees to the receive this information electronically (e.g., by clicking on the "Agree" icon).

Figure 7:
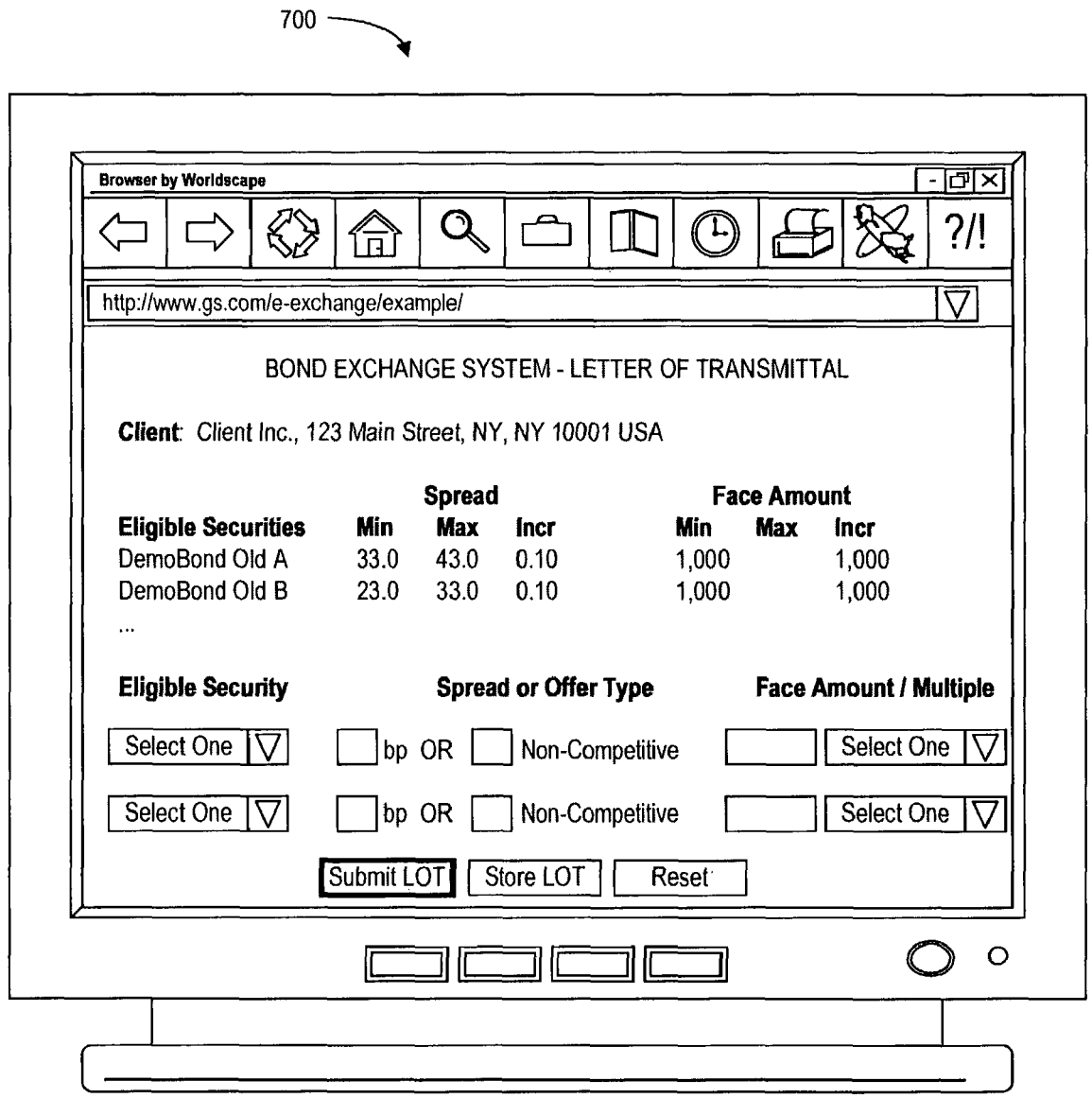

FIG. 7 illustrates a display 700 that a client can use to submit offer information to the bond exchange controller 210 according to some embodiments of the present invention. In particular, the client can view information about eligible securities, such as minimum, maximum, and increment spread values associated with each bond. Similarly, the client can view minimum, maximum,. and increment face values associated with each bond.

The client can also select one of the eligible securities via a drop down menu (which may help avoid incorrect or ambiguous entries). The client may then enter a spread and/or offer type for that bond, such as by entering the number of basis points associated with his or her bid (each basis point representing $1/100$th of one percent). Note that a bid might include a specific value (e.g., a spread or a price) or may instead be "non-competitive." Similarly, the client can enter a number of bonds associated with the bid.

According to some embodiments, this information comprises an electronic letter of transmittal for the bond exchange. Note that a single letter of transmittal might include bids for a number of different eligible securities.

The client may then submit the offer information to the remote bond exchange controller 210 (e.g., by clicking the "Submit LOT" icon). According to some embodiments, the client can instead choose to store the offer information (e.g., by clicking the "Store LOT" icon). In this case, the client can retrieve the potential offer information at a later time (e.g., to edit and/or submit the information). In this way, the client can prepare the offer information in advance and submit the offer near the close of the bond exchange (in case financial conditions change near the close). According to some embodiments, the client can also copy a subset of the offer information from a one letter of transmittal to another (e.g., general client information might be automatically copied to the new letter of transmittal).

Other information that might be submitted by the client includes beneficial owner information and client contact information (e.g., the client's name and address). According to some embodiments, the client can view a list of each letter of transmittal that he or she has submitted to the bond exchange controller 210 (but not letters of transmittal submitted by other clients). After the close of the bond exchange, allocation information might also be transmitted to the client device 240 (e.g., via a Web page or email message).

Current Bond Exchange Information

Figure 8:
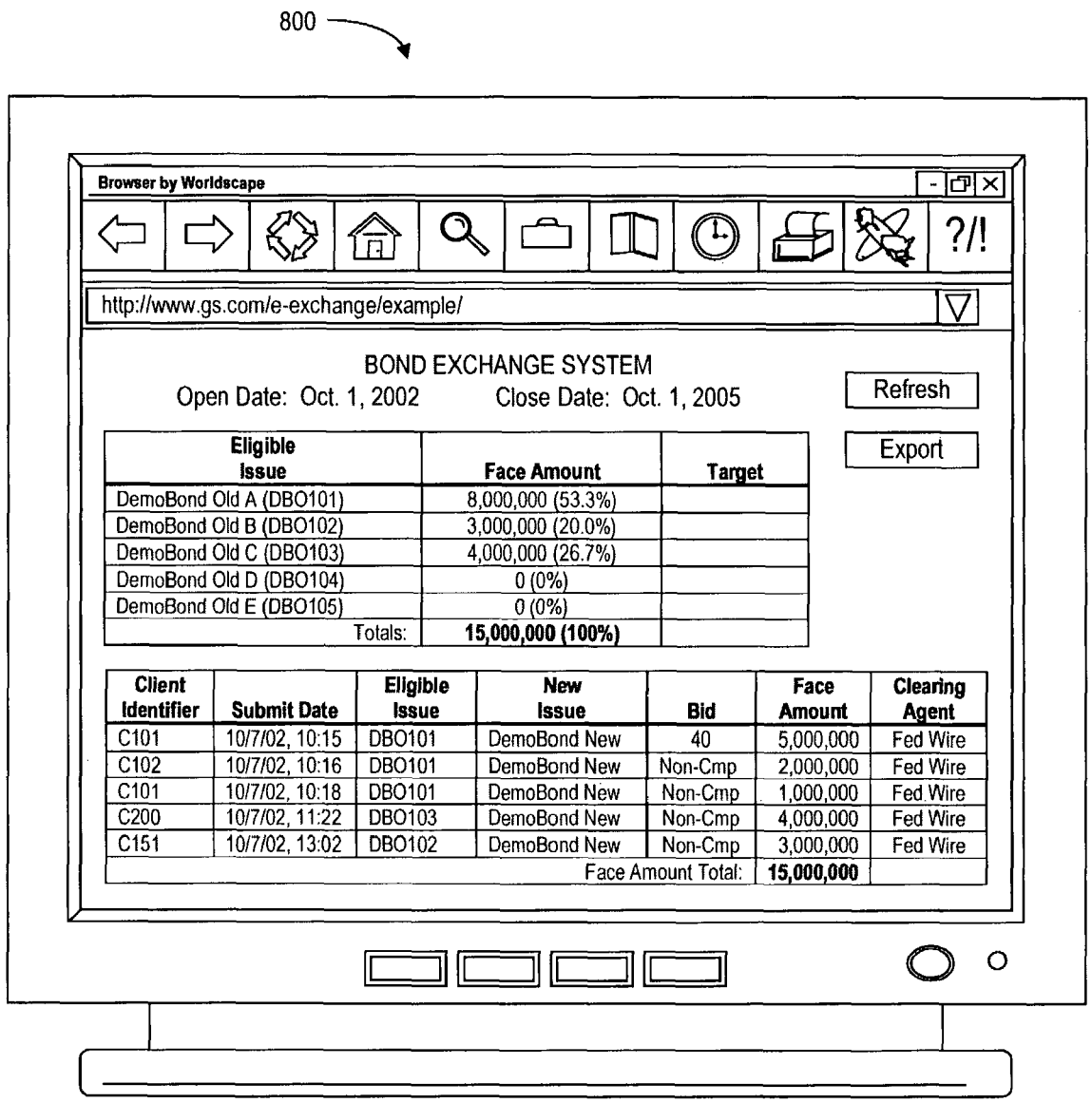
FIG. 8 illustrates a current bond exchange information display according to some embodiments of the present invention.

FIG. 8 illustrates a current bond exchange information display 800 that might be transmitted, for example, to a remote issuer device 220 according to some embodiments of the present invention. In particular, the display 800 indicates the cumulative face amount of the offers that have been received for each of the eligible issues (both as a number of bonds and as a percentage). If available, target information might also be displayed (e.g., representing the issuer's target for each of the eligible issues).

The display 800 also lists each offer that has been submitted, including the client's identifier, the date and time of the submission, the eligible issue, the bid amount, the face amount, and the clearing agent associated with the offer. The clearing agent may be, for example, the FED WIRE system that connects the US Federal Reserve offices, depository institutions, the Treasury, and other government agencies. In this way, the issuer can review all of the letters of transmittal that have been submitted during the exchange.

The issuer may also request that the display 800 be updated (e.g., by clicking on the "Refresh" icon). According to some embodiments, the issuer can define when the display 800 should be updated (e.g., once every five minutes or upon any change in the display's information). According to some embodiments, the issuer can also ask to have the information re-formatted (e.g., by clicking on the "Export" icon). For example, the issuer might request that the information be formatted as a MICROSOFT EXCEL® spreadsheet. According to still other embodiments, the information may be used to generate a demand curve that is then displayed to the issuer.

Hypothetical Analysis Information

Figure 9:
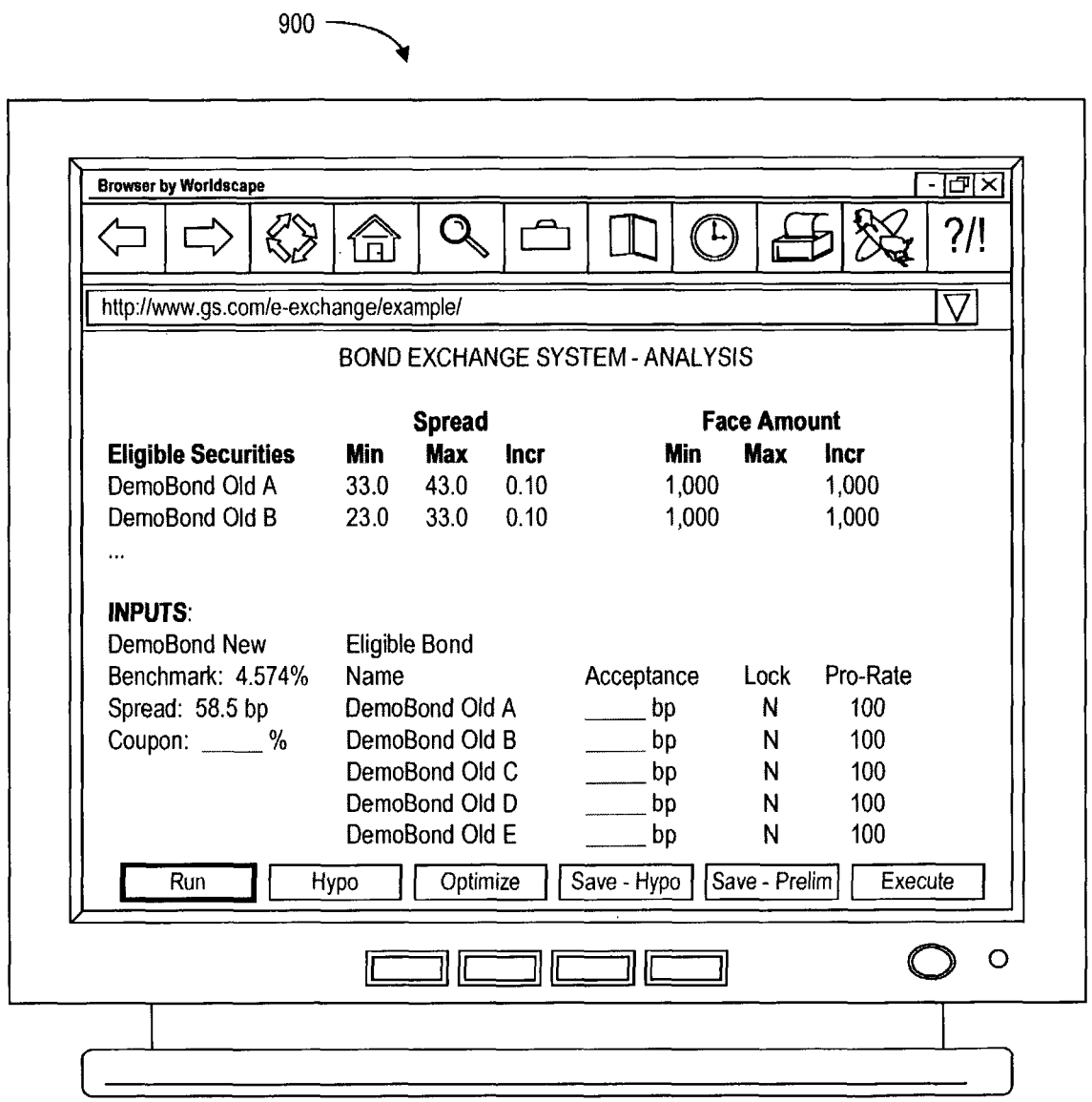
FIGS. 9 and 10 illustrate hypothetical analysis displays according to some embodiments of the present invention.
Figure 10:
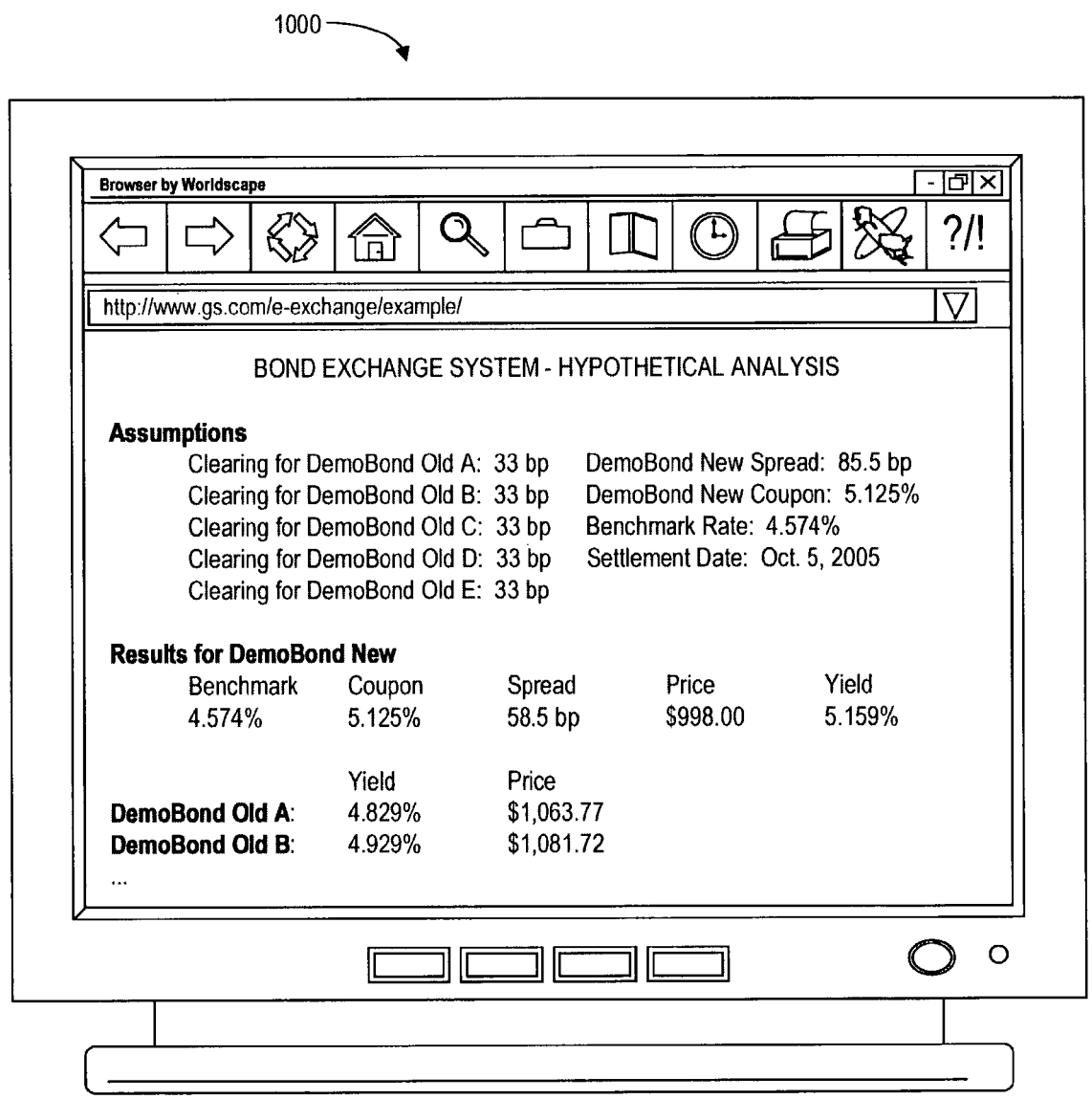

FIGS. 9 and 10 illustrate hypothetical analysis displays that might be transmitted, for example, to a remote issuer device 220 according to some embodiments of the present invention. That is, the bond exchange controller 210 might calculate hypothetical analysis information (e.g., a "what if" analysis) based on real time information, such as a current value of a reference bond.

In particular, FIG. 9 illustrates a display 900 that can be used to input analysis information, such as benchmark information, spread information, coupon information, clearance levels (including locking levels), and pro-rationing information. After the appropriate information has been entered, the issuer can request that the calculations be performed (e.g., by clicking the "Run" icon). In this way, the issuer can determine preliminary allocations (e.g., to review the information before clients see the results). According to some embodiments, the issuer can also store the scenario information (e.g., by clicking the "Save-Hypo" icon).

The issuer can also ask to have the results optimized (e.g., by clicking the "Optimize" icon). For example, the bond exchange controller 210 might optimize clearing levels (e.g., by bringing down the level if there are no bids at the input level) and/or optimize clearance by determining levels based on target levels.

The issuer can also request that the scenario be executed as the final bond exchange (e.g., by clicking the "Execute" icon). In this case, the bond exchange controller 210 may automatically transmit an email message to client devices 240 (both for bonds that have been accepted and those that have not).

FIG. 10 illustrates a display 1000 that can be used to provide analysis information to the issuer, including assumptions associated with the hypothetical analysis. The display also includes the results for the new issue (e.g., a benchmark rate, coupon information, spread information, price information, and yield information) and each eligible issue (e.g., yield and price information). Other information that might be provided on the display include an eligible face amount, pro-rationing information, an accepted face amount, accepted bid information, a new bond amount, cash information, accrued interest information, a new issue percentage, and present value savings information.

Note that the hypothetical analysis might let a party view a potential bond allocation using fixed values. For example, the party might be able to view what would happen if a non-competitive bid for one thousand old bonds was submitted (e.g., the party might be provided with a new bond and cash allocation). Moreover, the analysis may be updated in substantially real time to market (e.g., when values are based on spreads to a reference bond that changes value to market conditions).

System Information

Figure 11:
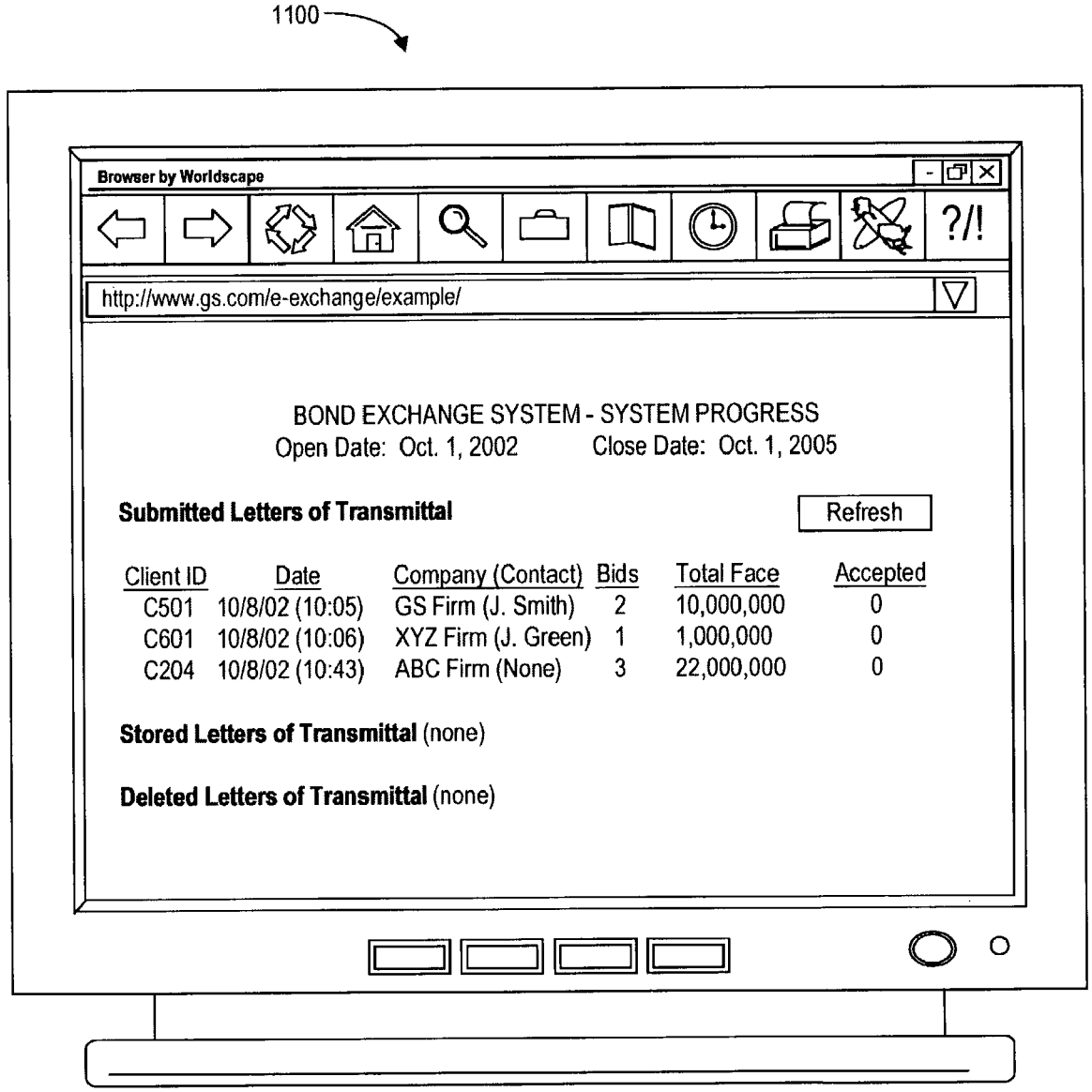
FIGS. 11 through 13 illustrate system displays according to some embodiments of the present invention.
Figure 12:
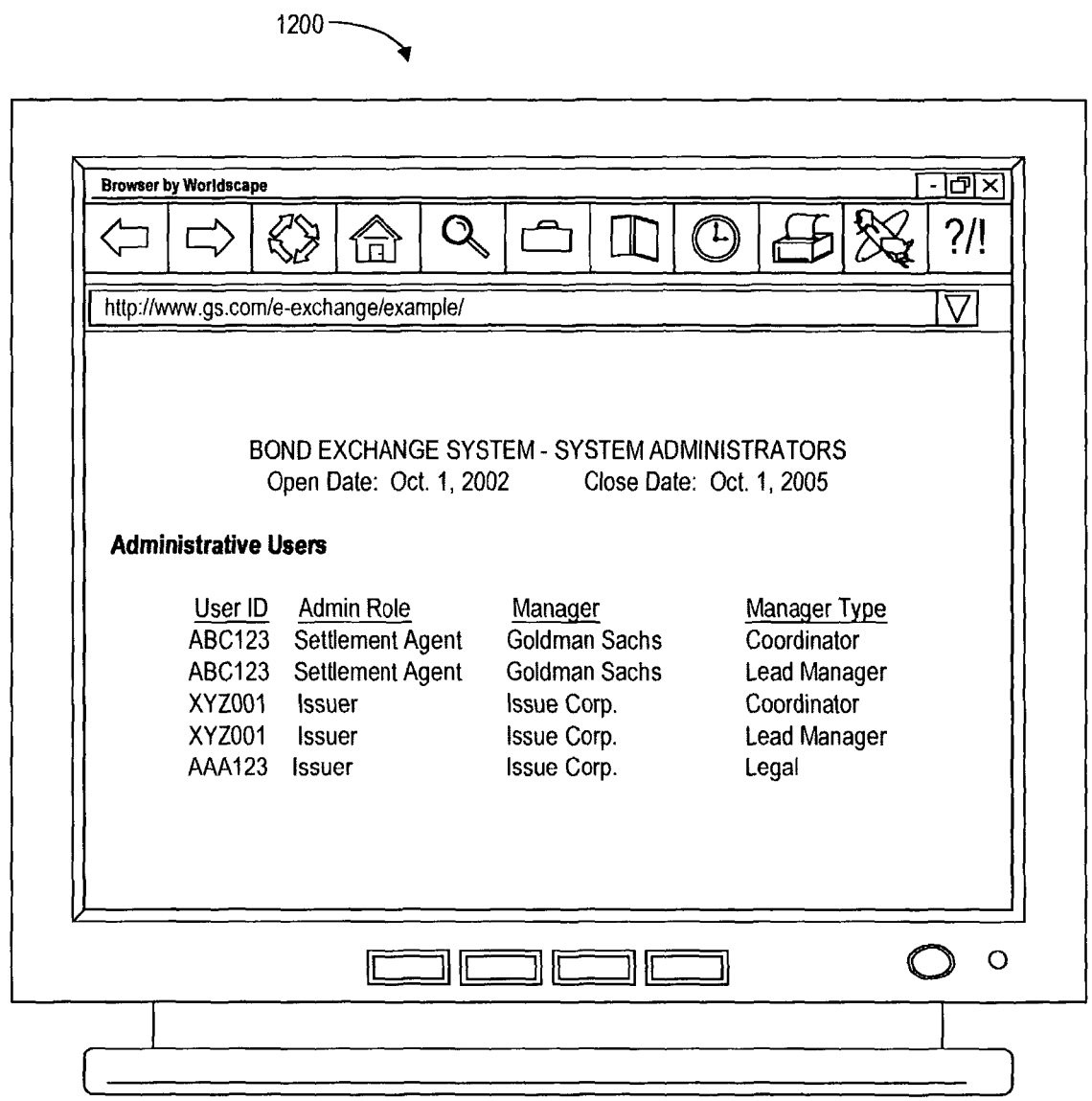
Figure 13:
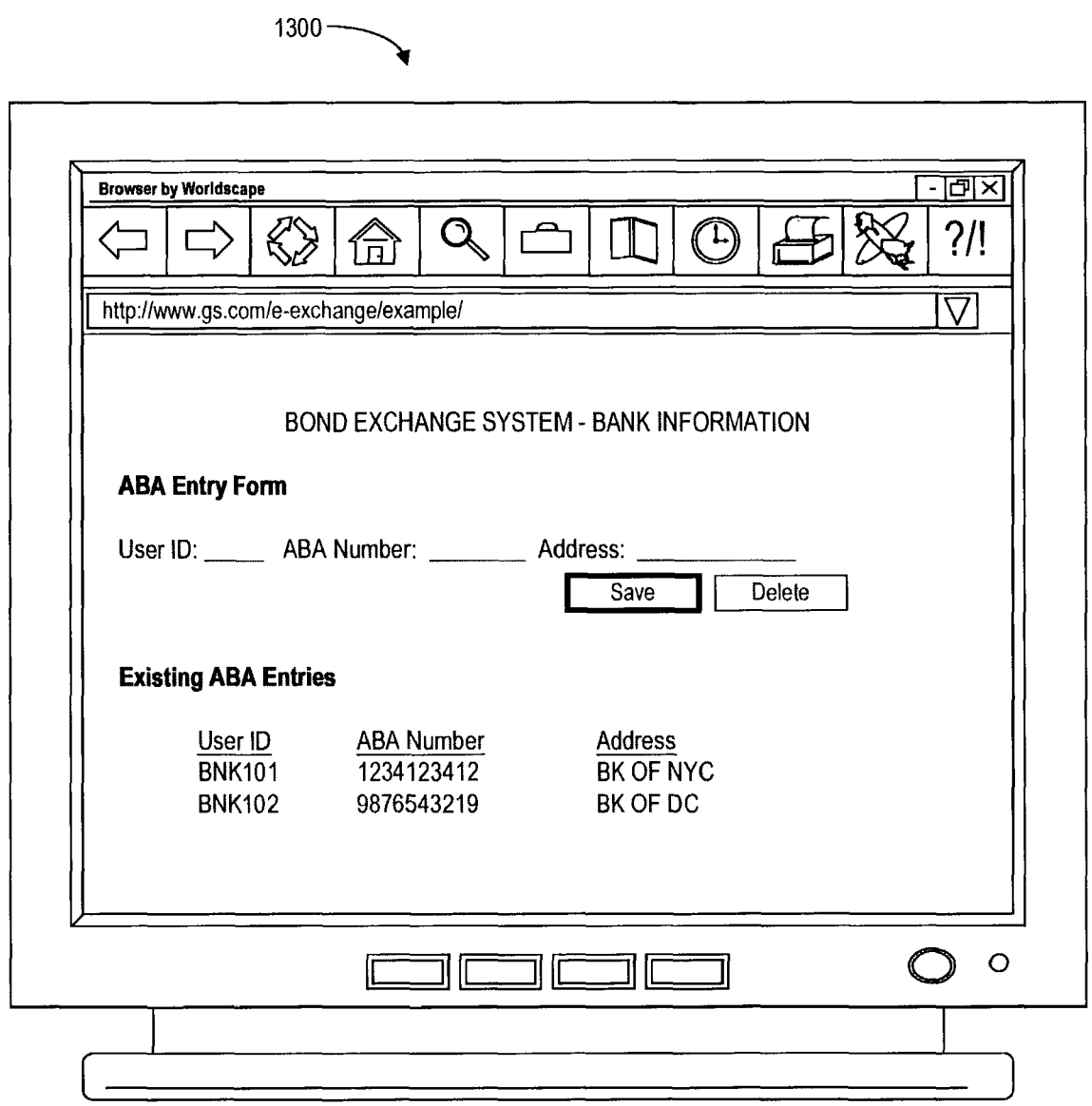

FIGS. 11 through 13 illustrate system displays according to some embodiments of the present invention. In particular, FIG. 11 illustrates a system progress display 1100 that lists all of the offer information that has been received by the bond exchange controller 210 (e.g., letters of transmittal that have been submitted, stored, or deleted). In this way the entire bid history can be examined. FIG. 12 illustrates a system administrator display 1200 that lists the administrative users along with their identifier, role, manager, and manager type (e.g., coordinator or lead manager).

FIG. 13 illustrates a bank information display 1300 that can be used to enter an American Banking Association (ABA) number and address. The display 1300 also lists existing ABA entries by user identifier. According to some embodiments, the information is validated by the bond exchange controller 210 and/or pre-populated where appropriate.

Settlement Agent Information

Figure 14:
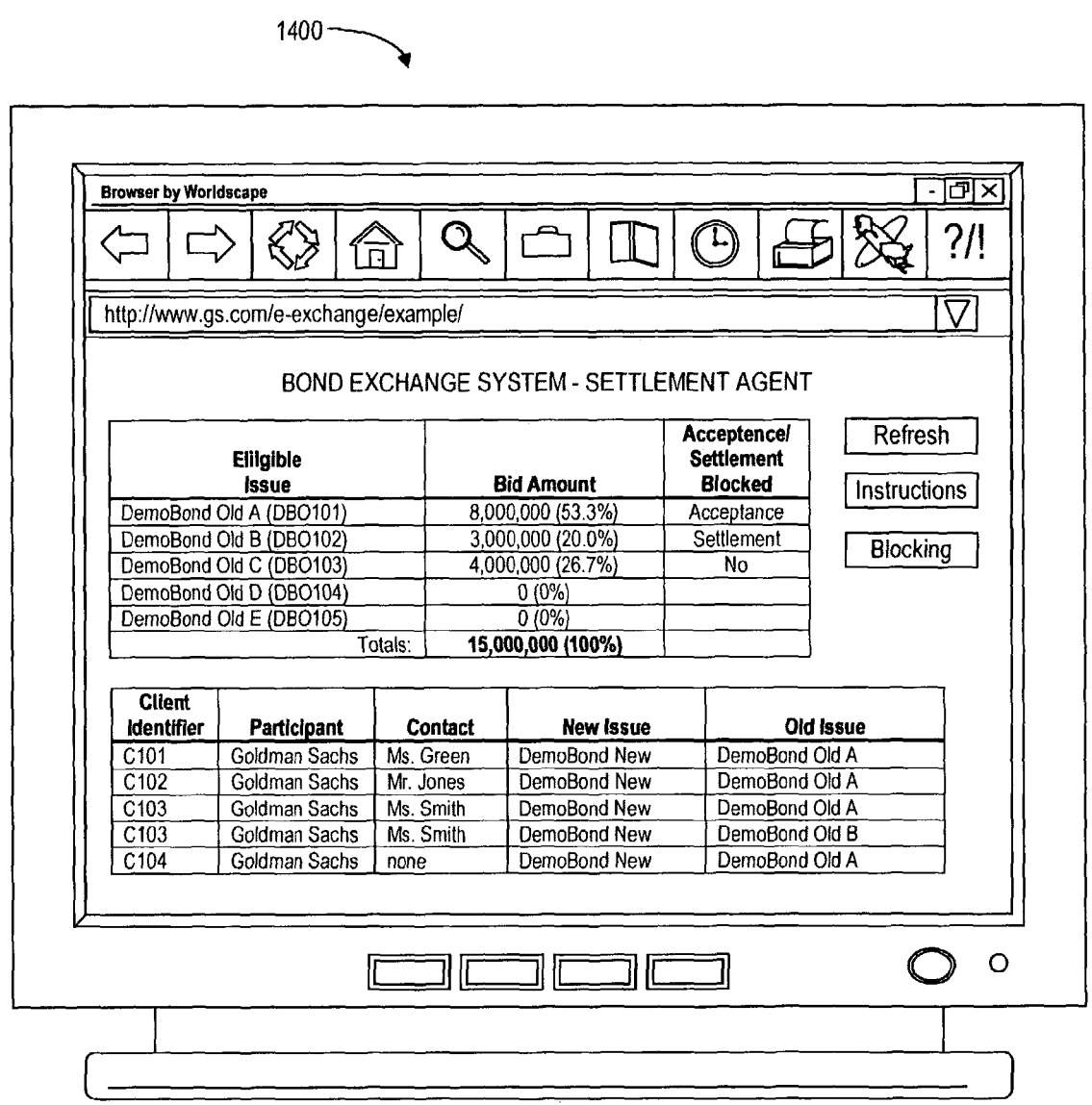
FIG. 14 illustrates a settlement agent display according to some embodiments of the present invention.

FIG. 14 illustrates a settlement agent display 1400 according to some embodiments of the present invention. In particular, the information on the display 1400 may be transmitted from the bond exchange controller 210 to a remote settlement agent device 250 and may include, for example, a settlement report, settlement instructions, acceptance blocking information, settlement blocking information, participant information, contact information, and/or refresh frequency information. Note that the bond exchange might be configured to only accept bonds having proper blocking instructions. For example, a bank might be allowed to vouch for blocking status in connection with the EUROCLEAR centralized clearing system for eurobonds and/or the CLEARSTREAM international clearing and settlement organization. The display 1400 may be used to review blocking status, to review bids (by bid number or account number), and/or to generate reports (e.g., including settlement instructions and blocking status reports).

Clearing Agent Information

Figure 15:
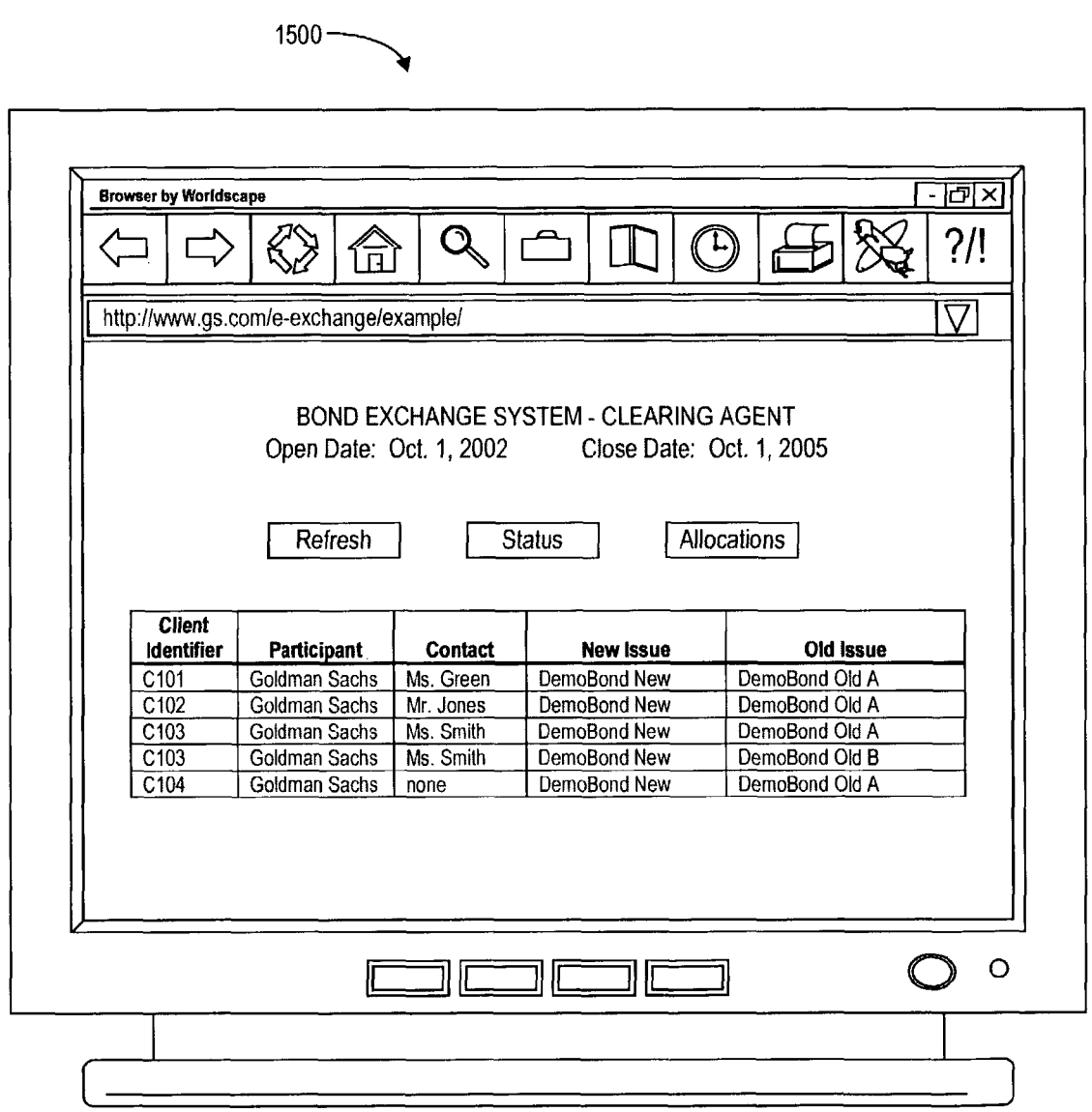
FIG. 15 illustrates a clearing agent display according to some embodiments of the present invention.

FIG. 15 illustrates a clearing agent display 1500 according to some embodiments of the present invention. In particular, the information on the display 1500 may be transmitted from the bond exchange controller 210 to a remote clearing agent device 260 and may include, for example, a clearing status, preliminary allocations, final allocations, participant information, contact information, and/or refresh frequency information. Note that the clearing agent display 1500 may be similar to the settlement agent display 1400, but will include only the information that is appropriate for that particular clearing agent.

Bond Exchange Controller

Figure 1:
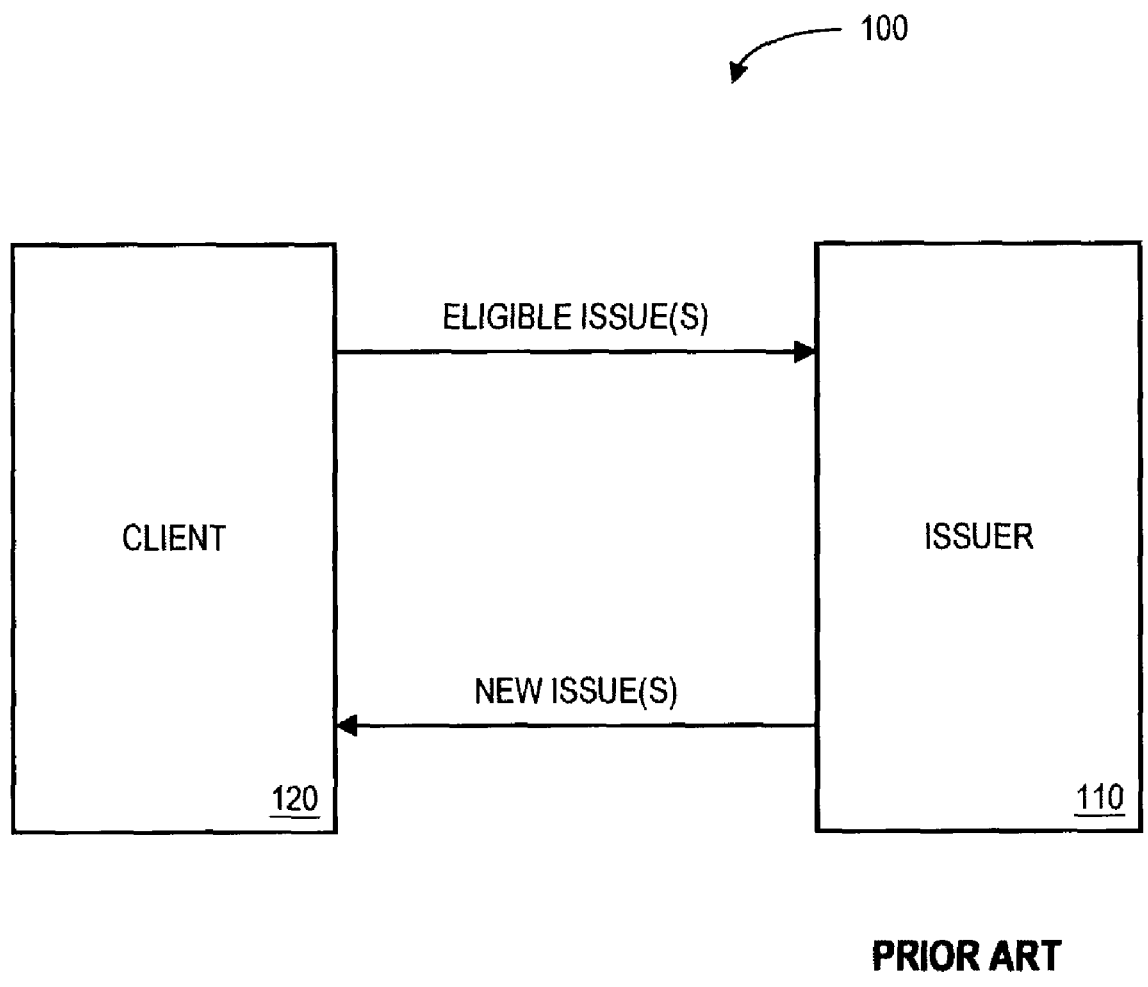
FIG. 1 illustrates a known bond exchange.
Figure 16:
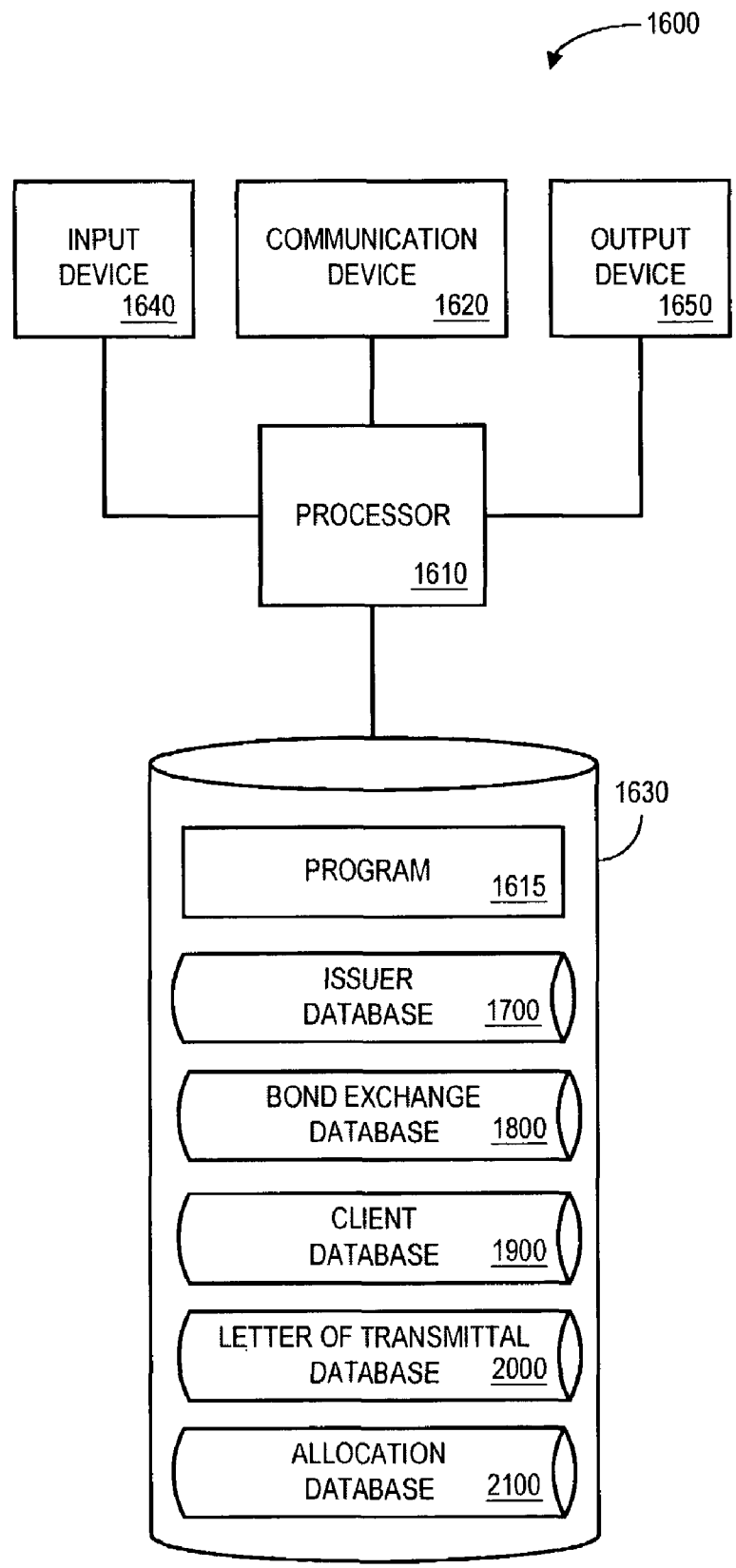
FIG. 16 is a block diagram of a bond exchange controller according to one embodiment of the present invention.

FIG. 16 is a block diagram of a bond exchange controller 1600 that is descriptive of the device shown, for example, in FIG. 1 according to an embodiment of the present invention. The bond exchange controller 1600 comprises a processor 1610, such as one or more INTEL® Pentium® processors, coupled to a communication device 1620 configured to communicate via a communication network. The communication device 1620 may be used to communicate, for example, with one or more issuer devices 220, client devices 240, settlement agent devices 250, and/or clearing agent devices 260. The bond exchange controller 1600 may further include an input device 1640 (e.g., a mouse and/or keyboard to input bond exchange information) and an output device 1650 (e.g., a computer monitor to output bond exchange information).

The processor 1610 is also in communication with a storage device 1630. The storage device 1630 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 1630 stores a program 1615 for controlling the processor 1610. The processor 1610 performs instructions of the program 1615, and thereby operates in accordance with the present invention. For example, the processor 1610 may automatically calculate a bond exchange allocation.

As used herein, information may be "received" by or "transmitted" to, for example: (i) the bond exchange controller 1600 from another device; or (ii) a software application or module within the bond exchange controller 1600 from another software application, module, or any other source.

Figure 21:

As shown in FIG. 16, the storage device 1630 also stores: an issuer database 1700 (described with respect to FIG. 17); a bond exchange database 1800 (described with respect to FIG. 18); a client database 1900 (described with respect to FIG. 19); a letter of transmittal database 2000 (described with respect to FIG. 20); and an allocation database 2100 (described with respect to FIG. 21). Examples of databases that may be used in connection with the bond exchange controller 1600 will now be described in detail with respect to FIGS. 17 through 21. The illustrations and accompanying descriptions of the databases presented herein are exemplary, and any number of other database arrangements could be employed besides those suggested by the figures.

Bond Exchange Databases

Referring to FIG. 17, a table represents the issuer database 1700 that may be stored at the bond exchange controller 1600 according to an embodiment of the present invention. The table includes entries identifying issuers that may be associated with bond exchanges. The table also defines fields 1702, 1704, 1706, 1708, 1710 for each of the entries. The fields specify: an issuer identifier 1702, an issuer name 1704, bond exchanges 1706, a contact name 1708, and contact information 1710. The information in the issuer database 1700 may be created and updated, for example, based on information received from a remote issuer device 220 or an operator associated with the bond exchange controller 210.

The issuer identifier 1702 and issuer name 1704 may represent a particular issuer. The bond exchanges 1706 may be identifiers representing the bond exchanges that are associated with that issuer. The contact name 1708 and contact information 1710 may represent, for example, a person that may be contacted in connection with the bond exchange.

Referring to FIG. 18, a table represents the bond exchange database 1800 that may be stored at the bond exchange controller 1600 according to an embodiment of the present invention. The table includes entries identifying bond exchanges. The table also defines fields 1802, 1804, 1806, 1808, 1810 for each of the entries. The fields specify: an exchange identifier 1802, one or more new issue identifiers 1804, one or more eligible issue identifiers 1806, an open date and time 1808, and a close date and time 1810. The information in the bond exchange database 1800 may be created and updated, for example, based on information received from a remote issuer device 220 or an operator associated with the bond exchange controller 210.

The exchange identifier 1802 may be an alphanumeric code associated with a particular bond exchange and may be based on, or associated with, the bond exchanges 1706 stored in the issuer database 1700. The new issue identifiers 1804 and eligible issue identifiers 1806 may represent bonds that associated with the exchange. The open date and time 1808 and close date and time 1810 may define when letters of transmittal will be accepted for the bond exchange.

Referring to FIG. 19, a table represents the client database 1900 that may be stored at the bond exchange controller 1600 according to an embodiment of the present invention. The table includes entries identifying clients that may be associated with bond exchanges. The table also defines fields 1902, 1904, 1906, 1908 for each of the entries. The fields specify: a client identifier 1902, a client name 1904, a contact name 1906, and contact information 1908. The information in the client database 1900 may be created and updated, for example, based on information received from a remote client device 240.

The client identifier 1902 and client name 1904 represent a particular client. The contact name 1906 and contact information 1908 may represent, for example, a person that may be contacted in connection with the bond exchange.

Referring to FIG. 20, a table represents the letter of transmittal database 2000 that may be stored at the bond exchange controller 1600 according to an embodiment of the present invention. The table includes entries identifying letters of transmittal that have been received in connection with bond exchanges. The table also defines fields 2002, 2004, 2006, 2008, 2010, 2012, 2014 for each of the entries. The fields specify: an offer identifier 2002, a submission date and time 2004, an exchange identifier 2006, an eligible issue identifier 2008, an amount 2010, a price 2012, and a status 2014. The information in the letter of transmittal database 2000 may be created and updated, for example, based on information received from a remote client device 240.

The offer identifier 2002 may be an alphanumeric code associated with a particular letter of transmittal. The submission date and time 2004 may indicate when the letter of transmittal was received. The exchange identifier 2006 may be an alphanumeric code associated with a particular bond exchange and may be based on, or associated with, the bond exchanges 1706 stored in the issuer database 1700 and/or the exchange identifiers 1802 stored in the bond exchange database 1800. The eligible issue identifier 2008 may be an alphanumeric code associated with a particular bond and may be based on, or associated with, the eligible issue identifiers 1806 stored in the bond exchange database 1800. The amount 2010 and price 2012 define the terms of the bid. The status 2014 might indicate, for example, whether the letter of transmittal has been submitted, saved, accepted, or deleted.

Referring to FIG. 21, a table represents the allocation database 2100 that may be stored at the bond exchange controller 1600 according to an embodiment of the present invention. The table includes entries define how bonds will be distributed after the close of the exchange. The table also defines fields 2102, 2104, 2106, 2108, 2110, 2112 for each of the entries. The fields specify: an exchange identifier 2102, a new issue identifier 2104, a client identifier 2106, an amount 2108, a price 2110, and a status 2112. The information in the allocation database 2100 may be created and updated, for example, based on calculations performed by the bond exchange controller 210. Note that the status 2112 might indicate whether a particular allocation has been blocked, settled, and/or cleared.

Web Server Example

Figure 22:
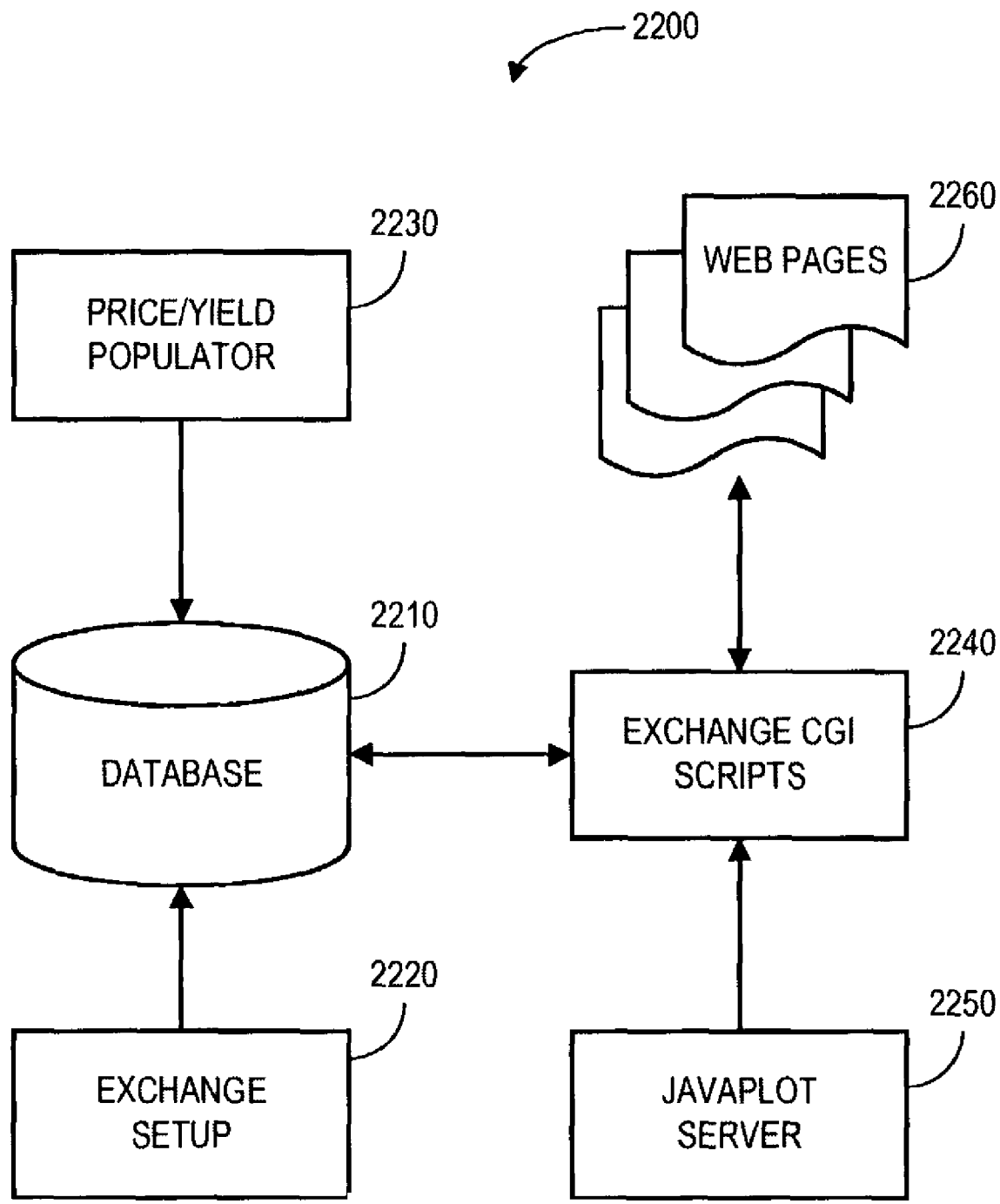
FIG. 22 illustrates an example of a bond exchange Web server according to one embodiment of the present invention.

FIG. 22 illustrates an example of a bond exchange Web server 2200 according to one embodiment of the present invention. The Web server includes a database 2210 that may, for example, include any of the information described with respect to FIGS. 17 through 21. Note that the database 2210 might include information about a plurality of bond exchanges and/or a plurality of issuers. The database 2210 also receives information from an exchange setup unit 2220 (e.g., to provide basic information about the bond exchange) and a price/yield populator 2230 (e.g., to allow for any security in an exchange).

The database 2210 also provides information to exchange Common Gateway Interface (CGI) scripts 2240 that generate Web pages 2260 to display the information. According to some embodiments, a JavaPlot server 2250 is used to generate demand curves for the Web pages 2260. The JavaPlot server 2250 may, for example, generate graphs based on a data set. The Web pages 2260 may also be used to store information into the database 2210 via the exchange CGI scripts 2240.

Figure 23:
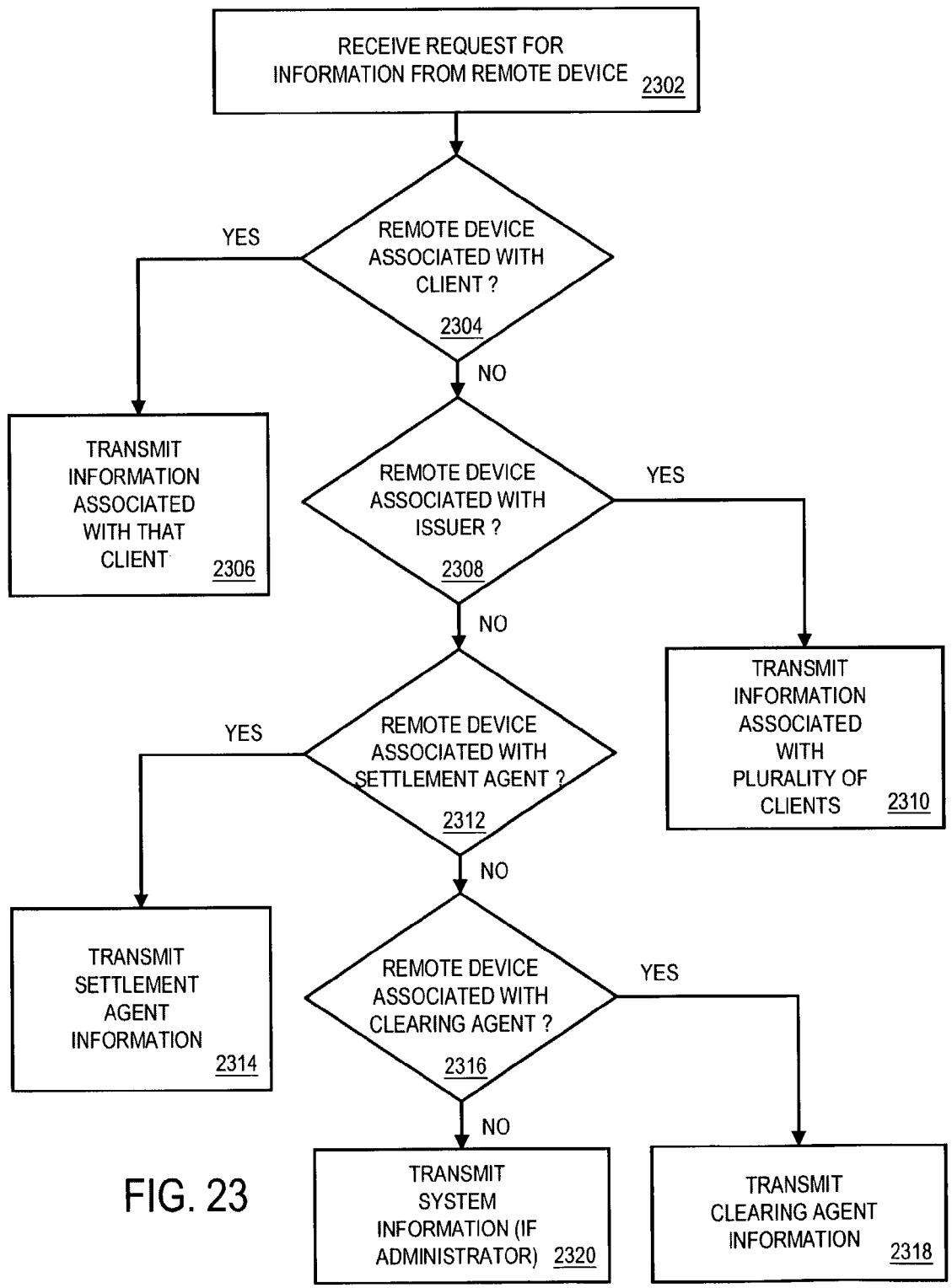
FIG. 23 is a flow chart of a bond exchange Web server method according to some embodiments of the present invention.

FIG. 23 is a flow chart of a bond exchange Web server 2200 method according to some embodiments of the present invention. At 2302, a request for information is received from a remote device. If the remote device is associated with a client at 2304 (e.g., based on a user identifier and password associated with the request), information associated with that client is transmitted at 2306. For example, a Web page listing that client's letters of transmittal might be transmitted to a remote client device 240.

If the remote device is associated with an issuer at 2308 (e.g., based on a user identifier and password associated with the request), information associated with a number of different clients is transmitted at 2310. For example, a Web page listing letters of transmittal received from a number of different client might be transmitted to a remote client issuer 220.

If the remote device is associated with settlement agent at 2312, the Web server 2200 transmits settlement agent information at 2314 (e.g., to a settlement agent device 250). Similarly, if the remote device is associated with clearing agent at 2316, the Web server 2200 transmits clearing agent information at 2318 (e.g., to a clearing agent device 260). Finally, the Web server 2200 might transmit system user information if appropriate at 2320 (e.g., when the request for information was received from a system administrator).

Figure 24:
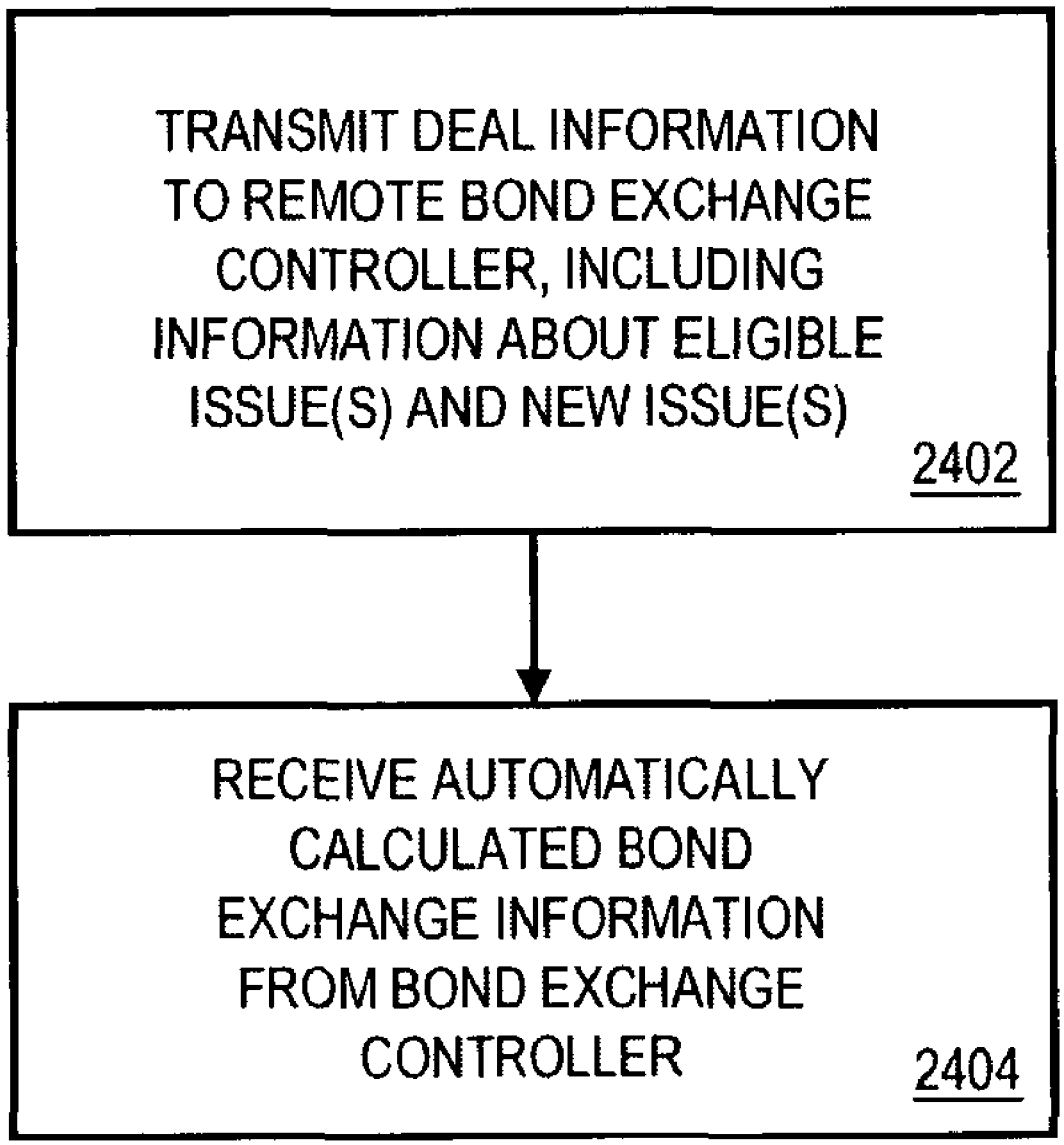
FIG. 24 is a flow chart of an issuer device method according to some embodiments of the present invention.

FIG. 24 is a flow chart of an issuer device 220 method according to some embodiments of the present invention. In particular, deal information associated with a bond exchange is transmitted to a remote bond exchange controller 210 at 2402, the deal information including information associated with at least one eligible issue and at least one new issue. At 2404, bond exchange allocation information is received from the bond exchange controller 210 (e.g., via a Web page or email message), the bond exchange allocation information being automatically calculated based on the deal information and offer information provided from a client device.

Figure 25:
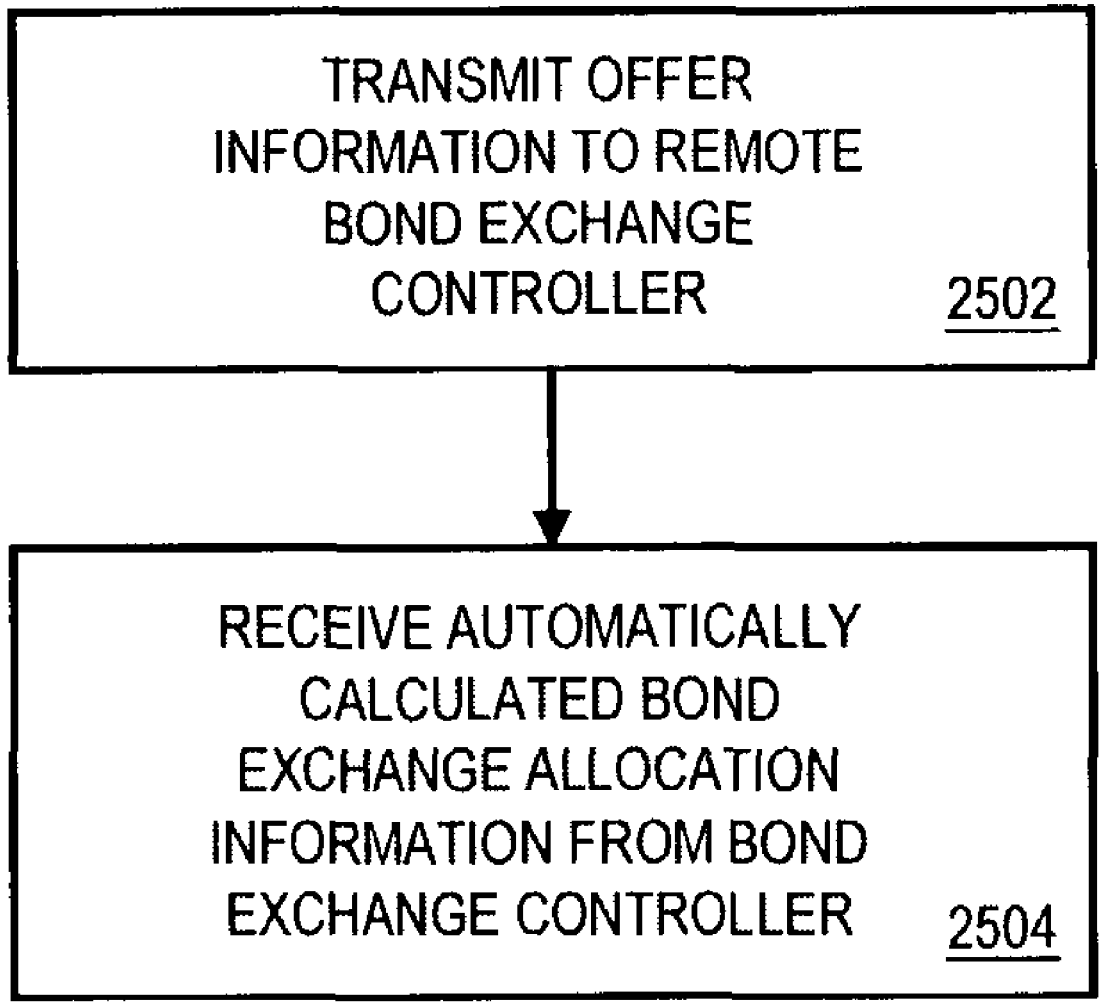
FIG. 25 is a flow chart of a client device method according to some embodiments of the present invention.

FIG. 25 is a flow chart of a client device 240 method according to some embodiments of the present invention. In particular, offer information is transmitted to a remote bond exchange controller 210 via a communication network at 2502. At 2504, bond exchange allocation information is received from the bond exchange controller 210, the bond exchange allocation information being automatically calculated based on the offer information and deal information associated with a bond exchange, the deal information including information associated with at least one eligible issue and at least one new issue.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments of the present invention have been described with respect to storing potential letters of transmittal at the bond exchange controller 1600, according to other embodiments some or all of this information is instead stored at the client device 210.

Moreover, although some embodiments have been described with respect to a bond exchange, the present invention can be used in exchanges associated with any type of financial instrument. For example, embodiments may be used to exchange old and new instruments where a fixed value is assigned to one instrument and a bided value is assigned to the other instrument. Moreover, the term "instrument" could actual refer to a set of individual instruments. For example, an exchange might involve collecting old bonds and providing new bonds along with warrants having separate expiration dates.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A processor-implemented method, comprising:
   determining deal information associated with a bond exchange, the deal information including information associated with a plurality of existing eligible issues and at least one new issue to be exchanged for the eligible issues;
   determining target information associated with at least one of the issues;
   receiving first offer information from a first remote client device via a communication network;
   receiving second offer information from a second remote client device;
   automatically calculating by a processor an allocation for the bond exchange based on the deal information, the target information, and the first and second offer information, wherein the allocation includes: (1) a first allocated amount of the new issue to be associated with the first offer information and (2) a second allocated amount of the new issue to be associated with the second offer information, the first and second allocated amounts being different;
   providing the first allocated amount of the new issue to the first remote client device; and
   providing the second allocated amount of the new issue to the second remote client device.

2. The method of claim 1, wherein the bond exchange is associated with a plurality of eligible issues and a plurality of new issues.

3. The method of claim 1, wherein the deal information includes at least one of: (i) issuer information, (ii) an issuer identifier, (iii) a bond identifier, (iv) an open date, (v) an open time, (vi) a close date, (vii) a close time, (viii) a settlement date, (ix) a deal status, (x) supplemental deal information, (xi) yield information, (xii) reference bond information, (xiii) a minimum price, (xiv) a maximum price, or (xv) a price increment.

4. The method of claim 1, wherein the received offer information comprises an electronic letter of transmittal.

5. The method of claim 1, wherein the received offer information includes at least one of: (i) a client identifier, (ii) client information, (iii) a bond exchange identifier, (iii) a bond identifier, (iv) a bond amount, (v) a bid type, (vii) clearing agent information, (viii) a bond price, or (ix) a bond spread.

6. The method of claim 1, wherein the bond exchange allocation is based on at least one of: (i) an offer date, (ii) an offer time, or (iii) an optimization of issuer benefit.

7. The method of claim 1, wherein the communication network comprises at least one of: (i) a public network, (ii) a proprietary network, (iii) a wireless network, or (iv) the Internet.

8. The method of claim 1, wherein deal information may be associated with any of a plurality of bond exchanges and a plurality of issuers.

9. The method of claim 1, further comprising:
receiving potential offer information from the client device.

10. The method of claim 1, further comprising:
transmitting bond exchange information to the remote client device.

11. The method of claim 10, wherein the bond exchange information transmitted to the client device comprises at least one of: (i) an exchange supplement, (ii) an offering circular, (iii) a hypothetical example, (iv) agreement information, (v) a list of electronic letters of transmittal associated with a particular client, or (vi) allocation information.

12. The method of claim 1, further comprising:
transmitting issuer information to a remote issuer device.

13. The method of claim 12, wherein the issuer information transmitted to the issuer device comprises at least one of: (i) a list of electronic letters of transmittal associated with a plurality of clients, (ii) cumulative total information, (iii) allocation amounts, (iv) allocation percentages, or (v) re-formatted information.

14. The method of claim 12, wherein the issuer information transmitted to the issuer device comprises at least one of: (i) setup information, (ii) an issuer identifier, (iii) a bond identifier, (iv) an open date, (v) an open time, (vi) a close date, (vii) a close time, (viii) a settlement date, (ix) yield information, (x) price information, (xi) reference bond information, (xii) a minimum price, (xiii) a maximum price, or (xiv) a price increment.

15. The method of claim 12, wherein the issuer information transmitted to the issuer device comprises at least one of: (i) analysis information, (ii) a bond identifier, (iii) a minimum spread, (iv) a maximum spread, (v) a spread increment, (vi) a minimum face amount, (vii) a maximum face amount, or (viii) a face amount multiple.

16. The method of claim 1, further comprising:
transmitting settlement agent information to a remote settlement agent device.

17. The method of claim 16, wherein the settlement agent information transmitted to the settlement agent device comprises at least one of: (i) a settlement report, (ii) settlement instructions, (iii) acceptance Mocking information, (iv) settlement blocking information, (v) participant information, (vi) contact information, or (vii) refresh frequency information.

18. The method of claim 1, further comprising: transmitting clearing agent information to a remote clearing agent device.

19. The method of claim 18, wherein the clearing agent information transmitted to the clearing agent device comprises at least one of: (i) a clearing status, (ii) preliminary allocations, (iii) final allocations, (iv) participant information, (v) contact information, or (vi) refresh frequency information.

20. The method of claim 1, further comprising:
providing at least one of: (i) system progress information, (ii) submitted letters of transmittal information, (iii) stored letters of transmittal information, or (iv) deleted letters of transmittal information.

21. The method of claim 1, further comprising:
providing at least one of: (i) system administrator information, (ii) an administrator identifier, (iii) an administrator role, or (iv) manager information.

22. The method of claim 1, further comprising:
exchanging at least one of: (i) system bank entry form information, (ii) a user identifier, (iii) a bank identifier, or (iv) a bank address.

23. The method of claim 1, further comprising:
calculating hypothetical analysis information.

24. The method of claim 23, wherein the hypothetical analysis information includes at least one of: (i) assumption information, (ii) assumed clearing information for a plurality of eligible issues, (iii) assumed spread information for at least one new issue, (iv) assumed coupon information for at least one new issue, (v) an assumed benchmark rate, (vi) an assumed settlement date, or (vii) hypothetical yield information.

25. The method of claim 23, further comprising:
receiving input information from a remote issuer device, the input information being used to calculate the hypothetical analysis information and including at least one of: (i) a bond identifier, (ii) a benchmark, (iii) a spread, (iv) a coupon, (v) an acceptable indication, (vi) a lock indication, or (vii) a clearance optimization indication.

26. The method of claim 23, further comprising at least one of: (i) storing the hypothetical analysis information, (ii) storing the hypothetical analysis information as a preliminary allocation, or (iii) executing the hypothetical analysis information as a final execution.

27. An apparatus, comprising:
a processor;
a communication device coupled to said processor and adapted to communicate via a communication network; and
a storage device in communication with said processor and storing instructions adapted to be executed by said processor to:
determine deal information associated with a bond exchange, the deal information including information associated with a plurality of existing eligible issues and at least one new issue to be exchanged for the eligible issues;
determine target information associated with at least one of the issues;
receive first offer information from a first remote client device via a communication network, the first offer information being associated with a first number of bonds;
receive second offer information from a second remote client device, the second offer information being for a second number of bonds;
automatically calculate an allocation for the bond exchange based on the deal information, the target information, and the first and second offer information, wherein the allocation includes: (1) a first allocated amount to be associated with the first offer information, the first allocated amount being different than the first number of bonds and (2) a second allocated amount to be associated with the second offer information, the second allocated amount being different than the second number of bonds;
provide the first allocated amount to the first remote client device; and
provide the second allocated amount to the second remote client device.

28. The apparatus of claim 27, wherein said storage device further stores at least one of: (i) an issuer database, (ii) a bond exchange database, (iii) a client database, (iv) a letter of transmittal database, or (v) an allocation database.

29. The apparatus of claim 27, wherein said communication device is adapted to communicate with at least one of: (i) an issuer device, (ii) a client device, (iii) a settlement agent device, or (iv) a clearing agent device.

30. A processor-readable medium storing a plurality of processing instructions for performing a method, comprising issuable instructions by a processor to:

determine deal information associated with a bond exchange, the deal information including information associated with a plurality of existing eligible issues and at least one new issue to be exchanged for the eligible issues;

determine target information associated with at least one of the issues, the target information including a target bond price and a target bond quantity;

receive first offer information from a first remote client device via a communication network;

receive second offer information from a second remote client device; and automatically calculate an allocation for the bond exchange based on the deal information, the target bond price, the target bond quantity, and the first and second offer information, wherein the allocation includes: (1) a first allocated amount of the new issue to be associated with the first offer information and (2) a second allocated amount of the new issue to be associated with the second offer information, the first and second allocated amount being different amounts;

provide the first allocated amount of the new issue to the first remote client device; and provide the second allocated amount of the new issue to the second remote client device.

\* \* \* \* \*